(12) United States Patent
Hayakawa et al.

(10) Patent No.: US 7,036,359 B2
(45) Date of Patent: May 2, 2006

(54) FAILURE DIAGNOSTIC SYSTEM FOR FUEL VAPOR PROCESSING APPARATUS

(75) Inventors: Masamitsu Hayakawa, Obu (JP); Masaharu Hayakawa, Obu (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 0 days.

(21) Appl. No.: 10/898,200

(22) Filed: Jul. 26, 2004

(65) Prior Publication Data

US 2005/0022588 A1 Feb. 3, 2005

(30) Foreign Application Priority Data

| Jul. 31, 2003 | (JP) | ............................. 2003-283516 |
| Aug. 5, 2003 | (JP) | ............................. 2003-286468 |
| Aug. 21, 2003 | (JP) | ............................. 2003-297005 |

(51) Int. Cl.
*G01M 15/00* (2006.01)
*G01M 19/00* (2006.01)

(52) U.S. Cl. ..................... 73/118.1; 73/117.2; 73/117.3; 73/116

(58) Field of Classification Search .................. 73/116, 73/117.2, 117.3, 118.1
See application file for complete search history.

(56) References Cited

U.S. PATENT DOCUMENTS

| 5,419,299 | A | * | 5/1995 | Fukasawa et al. ........... 123/520 |
| 5,450,833 | A | * | 9/1995 | Denz et al. .................. 123/520 |
| 5,490,414 | A | * | 2/1996 | Durschmidt et al. .......... 73/49.2 |
| 5,560,347 | A | * | 10/1996 | Reddy et al. ............... 123/520 |
| 6,305,361 | B1 | * | 10/2001 | Takaku et al. .............. 123/520 |
| 6,347,617 | B1 | * | 2/2002 | Kitamura et al. ............ 123/520 |
| 6,408,825 | B1 | * | 6/2002 | Enoki et al. ................ 123/467 |
| 6,832,509 | B1 | * | 12/2004 | Morinaga et al. ........... 73/118.1 |
| 6,854,321 | B1 | * | 2/2005 | Amlin ........................ 73/49.7 |
| 6,892,712 | B1 | * | 5/2005 | Miwa et al. ................. 123/520 |
| 2004/0237630 | A1 | * | 12/2004 | Cook et al. .................... 73/40 |
| 2004/0261506 | A1 | * | 12/2004 | Amlin ........................ 73/49.7 |

FOREIGN PATENT DOCUMENTS

| JP | A 2002-4959 | 1/2002 |
| JP | A 2003-113745 | 4/2003 |
| JP | A 2003-155958 | 5/2003 |

* cited by examiner

*Primary Examiner*—Edward Lefkowitz
*Assistant Examiner*—Freddie Kirkland, III
(74) *Attorney, Agent, or Firm*—Oliff & Berridge, PLC

(57) ABSTRACT

In a failure diagnostic system for a fuel vapor processing apparatus, a processing flow path comprising a vapor line, a canister and a purge line is closed with a vapor control valve and a purge control valve. The interior of the processing flow path is reduced in pressure or pressurized by rotating an air pump of a pump module in a forward or reverse direction. An electronic control unit (ECU) closes the vapor control valve and the purge control valve to close the processing flow path after stop of the engine and, when the fuel temperature detected by a temperature sensor is lower than a predetermined value, reduces the internal pressure of the processing flow path through an air pump, then checks air-tightness of the interior of the processing flow path based on behavior of a vapor pressure detected by a pressure sensor. The ECU closes the processing flow path and, when the fuel temperature detected is not lower than the predetermined value, pressurizes the interior of the processing flow path through the air pump, then checks air-tightness of the processing flow path based on behavior of a vapor pressure subsequently detected.

8 Claims, 27 Drawing Sheets

FAILURE DIAGNOSTIC SYSTEM FOR FUEL VAPOR PROCESSING APPARATUS

BACKGROUND OF THE INVENTION

1. Field of the Invention

The present invention relates to a fuel vapor processing apparatus wherein fuel vapor generated in a fuel tank is trapped or collected by a canister and the trapped fuel vapor is purged to an intake passage of an engine. More particularly, the present invention relates to a failure diagnostic system for checking a failure in air-tightness of a fuel vapor processing apparatus.

The present invention also relates to a canister which is included as one component in a fuel vapor processing apparatus and which incorporates in a casing, an adsorbent for adsorbing fuel vapor.

The present invention further relates to a pump module to be used in diagnosing a failure of a fuel vapor processing apparatus and more particularly to a pump module which permits failure diagnosis with a high accuracy.

2. Description of Related Art

As one of systems mounted on a vehicle, a fuel vapor processing apparatus has heretofore been known wherein fuel vapor generated in a fuel tank is treated without release to the atmosphere. This system is provided with a canister for trapping fuel vapor. Fuel vapor is trapped by once adsorbing the vapor on an adsorbent present in the interior of the canister. By utilizing a negative intake pressure developed in an intake passage during operation of an engine, a fuel component contained in the fuel vapor trapped by the canister is purged to the intake passage through a purge passage and is thereby used for combustion in the engine.

In this type of a treatment system, if the flow path from the fuel tank to the intake passage should be perforated in a certain position for some reason or other or if a sealing defect should occur in a pipe joint portion, there is a fear that fuel vapor may leak to the outside, and it is impossible to treat the fuel vapor properly. To cope with such a leakage trouble, it is necessary to perform diagnosis in an early stage. A related failure diagnostic system is described for example in Japanese unexamined patent publication No. 2003-155958 (pages 2 to 7, FIGS. 1 to 5)

The diagnostic system described in the above publication has, separately from a canister, a pump module for pressurizing the interior of the canister. The pump module sends out air into the canister, whereby a flow path extending from a fuel tank to an intake passage is pressurized. In this diagnostic system, when the internal pressure of the flow path once applied becomes lower than a predetermined value, it is determined that there is a leakage trouble in a fuel vapor processing apparatus. The pump module includes a pump, a solenoid valve and a filter, which components are integrally accommodated within a housing.

The above pump module can be mentioned as one of components having a failure diagnosing function necessary for the fuel vapor processing apparatus. The pump module is usually disposed near the canister. Generally, however, the space for mounting various components in a vehicle is limited. In view of this point, a concrete mounting method may be attaching the pump module integrally to the canister and fixing this integral combination to a vehicular frame. For example, in Japanese unexamined patent publication No. 2003-113745 (pages 2 to 6, FIGS. 1 to 3) there is described a structure wherein a valve is attached to an upper portion of a canister through first and second connecting parts. Adoption of the mounting structure described in this publication No. 2003-113745 may be effective also for the above canister and pump module.

On the other hand, another failure diagnostic system is disclosed in Japanese unexamined patent publication No. 2002-4959 (pages 2 to 3, FIG. 1). A basic way of thinking of this failure diagnostic system is as follows. An orifice is provided and a pressure change (leakage quantity) as a reference value is measured in advance. Thereafter, a flow path in a fuel vapor processing apparatus is made into a hermetically sealed space and is then brought into a state of a negative pressure. Subsequently, a pressure change in the flow path is compared with the pressure change as a reference value to determine whether fuel vapor is leaking or not.

However, in the failure diagnostic system disclosed in Japanese unexamined patent publication No. 2003-155958, the interior of the flow path is pressurized, so if the flow path should be perforated, the application of pressure may rather cause leakage of fuel vapor to the outside through the hole. Contrary to the application of pressure, it may be effective to once reduce the internal pressure of the flow path and determine that fuel vapor is leaking when the internal pressure of the flow path once reduced has become higher than a predetermined value. According to this method using such a reduced pressure, even if the flow path should be perforated, there is no fear of leakage of fuel vapor to the outside unlike the foregoing pressurizing method.

However, even if the reduced pressure method is adopted, a large amount of fuel vapor is developed in the fuel tank when the temperature is high. Accordingly, even if the pressure is reduced in this state, the internal pressure of the flow path is difficult to become negative and it takes much time for failure diagnosis. A solution to this problem may be the omission of failure diagnosis when the temperature is high. But, if diagnosis is not performed at a high temperature, the diagnosis is less frequently performed accordingly. This is contrary to the demand for early diagnosis upon occurrence of a failure or trouble.

On the other hand, in the diagnostic system disclosed in Japanese unexamined patent publication No. 2003-155958, if the pump module is connected to an upper portion of the canister, not only the size of the entire canister becomes larger, but also the center of gravity of the entire canister is largely offset to the outside by the pump module. In this state, for example, if the canister is attached to a vehicular frame through a bracket, the pump module will undergo vibration during vehicular running and vibrate, with consequent fear of breaking in the connection between the canister and the pump module. Thus, there has been a problem in point of reliability as a diagnostic system.

According to the diagnostic system disclosed in Japanese unexamined patent publication No. 2002-4959, in a certain mounted state thereof on a vehicle, there occurs a case where an orifice is positioned lower than the other flow path portion. If the orifice is thus positioned low, there is a fear of the orifice being plugged up with dust, water, fine adsorbent powder, intra-pipe oil, plastic extract, or assembling oil. Once the orifice is thus plugged up, it is no longer possible to effect diagnosis with a high accuracy.

SUMMARY OF THE INVENTION

The present invention has been accomplished in view of the above-mentioned circumstances and it is an object of the invention to provide a failure diagnostic system for a fuel vapor processing apparatus which failure diagnostic system can minimize the leakage of fuel vapor to the outside at the time of diagnosis and permits diagnosis positively in a short time even at a high temperature.

It is another object of the present invention to provide a canister provided with a diagnosing functional component integrally, the canister being compact as a whole and difficult to be influenced by vibration.

It is a further object of the present invention to provide a pump module for use in failure diagnosis of a fuel vapor processing apparatus wherein an orifice is disposed always in a vertex position in a mounted state of the pump module on a vehicle, thereby preventing blocking of the orifice and permitting an accurate execution of failure diagnosis.

To achieve the purpose of the invention, there is provided a failure diagnostic system for a fuel vapor processing apparatus which is disposed correspondingly to an engine mounted on a vehicle and wherein fuel vapor generated in a fuel tank is trapped by a canister and the trapped fuel vapor is purged to an intake passage in the engine, wherein the fuel vapor processing apparatus comprises a processing flow path extending from the fuel tank to the intake passage and including the canister; and the failure diagnostic system comprises: closure means for closing the processing flow path; pressurizing means for pressurizing the interior of the processing flow path; pressure reducing means for reducing the internal pressure of the processing flow path; pressure detecting means for detecting an internal pressure of the processing flow path; temperature detecting means for detecting an atmosphere temperature of the fuel tank; first diagnostic means which, after stop of the engine, controls the closure means to close the processing flow path and which, when the atmosphere temperature detected by the temperature detecting means is lower than a predetermined value, controls the pressure reducing means to reduce the internal pressure of the processing flow path and checks air-tightness of the processing flow path based on behavior of the pressure detected by the pressure detecting means after the pressure reduction; and second diagnostic means which, after stop of the engine, controls the closure means to close the processing flow path and which, when the atmosphere temperature detected by the temperature detecting means is higher than a predetermined value, controls the pressurizing means to pressurize the interior of the processing flow path and checks the air-tightness of the processing flow path based on behavior of the pressure detected by the pressure detecting means after the pressurization.

According to another aspect, the present invention provides a failure diagnostic system for a fuel vapor processing apparatus which is disposed correspondingly to an engine mounted on a vehicle and wherein fuel vapor generated in a fuel tank is trapped by a canister through a vapor line and the trapped fuel vapor is purged to an intake passage in the engine through a purge line, wherein the fuel vapor processing apparatus comprises a processing flow path extending from the fuel tank to the intake passage and including the vapor line, the canister and the purge line; the failure diagnostic system comprises: a vapor control valve disposed in the vapor line for closing the processing flow path and a purge control valve disposed in the purge line; a single air pump for selectively pressurizing the interior of the processing flow path or reducing the internal pressure of the processing flow path; a pressure sensor for detecting an internal pressure of the processing flow path; a temperature sensor for detecting an atmosphere temperature of the fuel tank; and an electronic control unit for checking air-tightness of the processing flow path; and the electronic control unit, after stop of the engine, controls the vapor control valve and the purge control valve to close the processing flow path and, when the atmosphere temperature detected by the temperature sensor is lower than a predetermined value, causes the air pump to rotate forward to suck in air, thereby reducing the internal pressure of the processing flow path, and checks air-tightness of the processing flow path based on behavior of the pressure detected by the pressure sensor after the pressure reduction, and the electronic control unit, after stop of the engine, controls the vapor control valve and the purge control valve to close the processing flow path and, when the atmosphere temperature detected by the temperature sensor is not lower than the predetermined value, causes the air pump to rotate reversely to discharge air, thereby pressurizing the interior of the processing flow path, and checks air-tightness of the processing flow path based on behavior of the pressure detected by the pressure sensor after the pressurization.

According to another aspect, the present invention provides a canister included in a fuel vapor processing apparatus for processing fuel vapor generated in a fuel tank and incorporating, in a casing, an adsorbent for adsorbing the fuel vapor, wherein the canister comprises a diagnosing function part for the fuel vapor processing apparatus, the diagnosing function part being integrally mounted nearly centrally of the casing.

According to another aspect, the present invention provides a pump module connected to a fuel vapor processing apparatus which is disposed correspondingly to an engine mounted on a vehicle and wherein fuel vapor generated in a fuel tank is trapped by a canister and a fuel component contained in the trapped fuel vapor is purged to an intake passage in the engine, the pump module being used for reducing the internal pressure of the fuel vapor processing apparatus and for diagnosing a failure of the fuel vapor processing apparatus based on behavior of the pressure detected at this time, wherein the pump module comprises: a vacuum pump for developing a negative pressure in the fuel vapor processing apparatus; a connection port connected to the fuel vapor processing apparatus; an air port including a first end and a second end, the first end being opened to the atmosphere; an orifice passage including a first end and a second end, the first end being connected to the connection port, the second end being connected to the vacuum pump, with an orifice being provided in an intermediate position of the orifice passage to calculate a reference value in failure diagnosis; a pressure detecting means for detecting an internal pressure of the fuel vapor processing apparatus and that of the orifice passage; and a change-over valve for changing from a state of communication to a cut-off state or vice versa between the connection port and the air port; and the orifice is disposed in a vertex direction in a mounted state of the pump module on the vehicle and is located at a higher position than an opening/closing portion of the change-over valve.

Further, according to another aspect, the present invention provides a pump module connected to a fuel vapor processing apparatus which is disposed correspondingly to an engine mounted on a vehicle and wherein fuel vapor generated in a fuel tank is trapped by a canister and a fuel component contained in the trapped fuel vapor is purged to an intake passage in the engine, the pump module being used for reducing the internal pressure of the fuel vapor processing apparatus and for diagnosing a failure of the fuel vapor processing apparatus based on behavior of the pressure detected at this time, the pump module comprising: a case; a vacuum pump installed in the case to develop a negative pressure in the fuel vapor processing apparatus; a connection port formed in the case and connected to the fuel vapor processing apparatus; an air port formed in the case and including a first end and a second end, the first end being opened to the atmosphere; an orifice passage formed in the case and having a first end and a second end, the first end being connected to the connection port, the second end being connected to the vacuum pump, with an orifice being provided in an intermediate position of the orifice passage to calculate a reference value in diagnosis; and a change-over valve for changing from a state of communication to a cut-off state or vice versa between the connection port and the air port, the change-over valve being mounted in the case while being rotated about an extension line extending in a movable direction of a valve body of the change-over valve, thereby disposing the orifice in a vertex direction and at a higher position than an opening/closing portion of the change-over valve.

DETAILED DESCRIPTION OF THE PREFERRED EMBODIMENTS

[First Embodiment]

A failure diagnostic system for a fuel vapor processing apparatus according to a first embodiment of the present invention will be described hereinafter with reference to the accompanying drawings.

Figure 1:
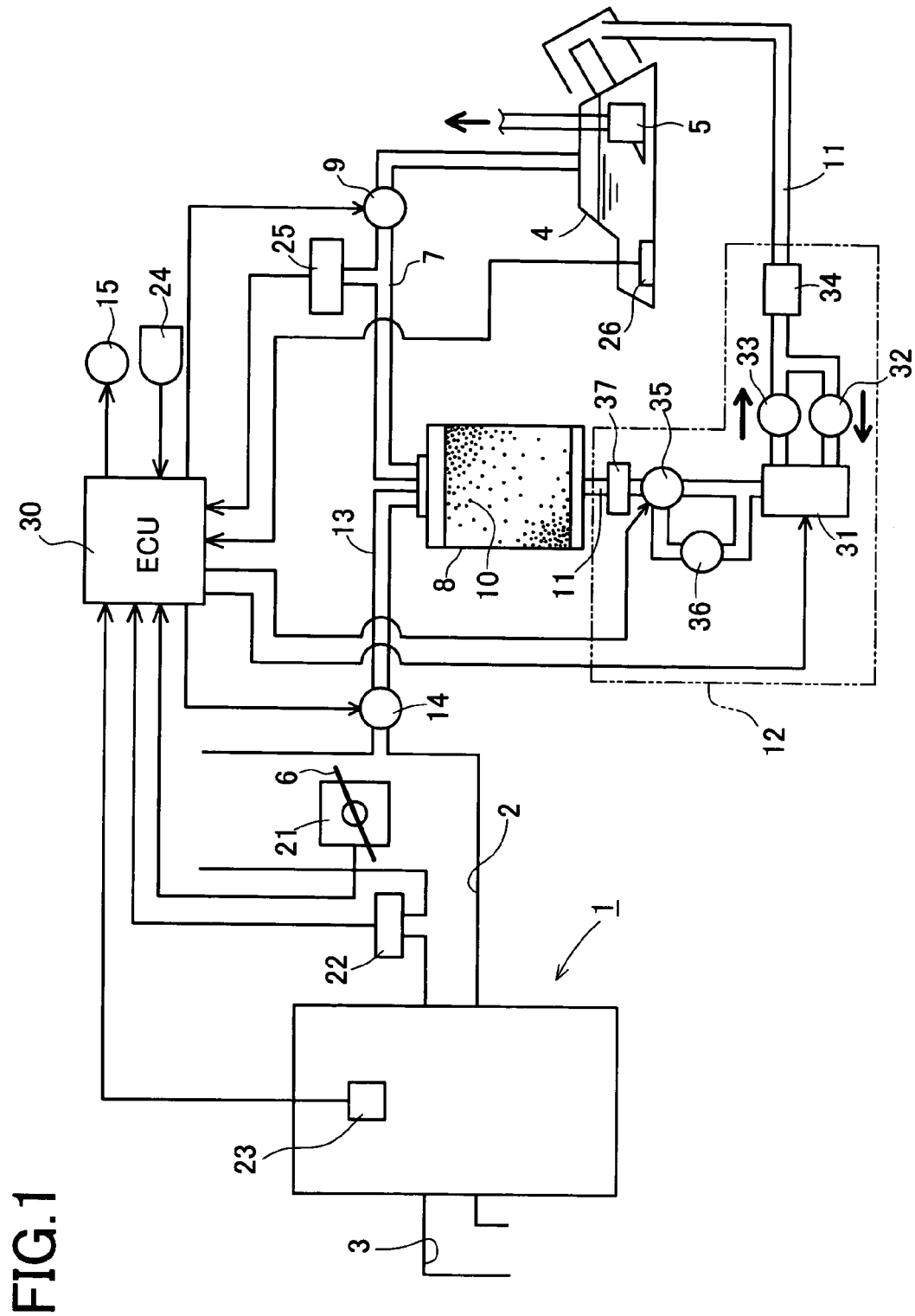
FIG. 1 is a schematic construction diagram of a fuel vapor processing apparatus and a failure diagnostic system therefor embodying the present invention.

FIG. 1 is a schematic construction diagram of the fuel vapor processing apparatus and a failure diagnostic system therefor embodying the present invention, which are mounted on an automobile. An engine 1 mounted on the automobile is provided with an intake passage 2 for the intake of outside air and an exhaust passage 3 for the discharge of exhaust gas. For combustion in a combustion chamber (not shown) of the engine 1, fuel stored in a fuel tank 4 is fed into the combustion chamber by a predetermined fuel supply system including a fuel pump 5.

A throttle valve 6 adapted to be opened and closed for adjusting the amount of intake air is disposed in the intake passage 2, and a throttle sensor 21 for detecting an opening degree (throttle angle) TA of the throttle valve 6 is provided in the throttle valve 6. An intake pressure sensor 22 for detecting an intake pressure PM is disposed in the intake passage 2. A rotational speed sensor 23 for detecting a rotational speed (engine speed) NE of the engine 1 is installed in the engine 1. Further, an ignition switch (IG switch) 24 which is operated for start and stop of the engine 1 is installed in the driver's seat of the automobile. The throttle sensor 21, intake pressure sensor 22, rotational speed sensor 23 and IG switch 24 correspond to operating condition detecting means for detecting an operating condition of the engine 1 and that of the automobile.

The fuel vapor processing apparatus is mounted on the automobile. This system is for collecting and processing evaporated fuel (vapor) generated in the fuel tank 4 without release into the atmosphere. This system is provided with a canister 8 which traps fuel vapor generated in the fuel tank 4 through a vapor line 7. A vapor control valve 9 for controlling the flow of vapor in the line 7 is disposed in the same line. The vapor control valve 9 is constituted by a solenoid valve. A vapor pressure sensor 25 for detecting the pressure (vapor pressure) Pb in the line 7 is disposed in the same line. The vapor pressure sensor 25 used in this embodiment corresponds to pressure detecting means in the present invention. A temperature sensor 26 is installed in the fuel tank 4. The temperature sensor 26 corresponds to temperature detecting means in the present invention for detecting an intra-tank fuel temperature TF as an atmosphere temperature in the fuel tank 4. Further, a warning lamp 15 is provided in the driver's seat. The warning lamp 15 is lit when it is determined that the fuel vapor processing apparatus is out of order.

The canister 8 contains an adsorbent 10 which comprises activated charcoal for adsorbing the fuel vapor. An air pipe 11 for introducing the air is connected to the bottom of the canister 8. A pump module 12 is installed in the air pipe 11.

A purge line 13 extends from the canister 8 and communicates with the intake passage 2 downstream of the throttle valve 6. A purge control valve 14 to be used for controlling the flow rate of purged vapor in the purge line 13 is disposed in the same line. The purge control valve 14 is constituted by a solenoid valve.

The pump module 12 is used for applying pressure and reducing pressure selectively within a processing flow path extending from the fuel tank 4 up to the intake passage 2 and including the canister 8. This processing flow path is closed off when the vapor control valve 9 and the purge control valve 14 are closed. The vapor control valve 9 and the purge control valve 14 correspond to closure means in the present invention. The pump module 12 includes an air pump 31, first and second check valves 32, 33 and an air filter 34 which are disposed on an air inlet side of the air pump 31, as well as a change-over valve 35, an orifice 36 and a trap canister 37 which are disposed on an air outlet side of the air pump 31. The air filter 34 is used for cleaning the air introduced into the air pump 31. The first and second check valves 32, 33 are connected in parallel with each other between the air pump 31 and the air filter 34. The first check valve 32 is used for inhibiting the flow of gas from the air pump 31 toward the atmosphere. The second check valve 33 is used for inhibiting the flow of air to the air pump 31. The air pump 31 is constituted by a vane pump having vanes which are rotated by a DC motor. The air pump 31 is constituted so as to suck in air by forward rotation of the DC motor. By this suction of air, the internal pressure of the foregoing processing flow path including the canister 8 is reduced. The air pump 31 corresponds to pressure reducing means in the present invention which is used for reducing the internal pressure of the processing flow path. The air pump 31 is adapted to discharge air by reverse rotation of the DC motor. By this discharge of air, the interior of the processing flow path including the canister 8 is pressurized. The air pump 31 corresponds to pressurizing means in the present invention which is used for pressurizing the interior of the processing flow path. Thus, in this embodiment, the pressure reducing means and the pressurizing means are constituted by one air pump 31. The change-over valve 35 and the orifice 36 are connected in parallel with each other between the air pump 31 and the trap canister 37. The change-over valve 35 is constituted by a solenoid valve. The change-over valve 35 is opened and closed selectively to inhibit and permit the reduction of pressure and pressurization for the interior of the processing flow path by the air pump 31. When turned ON, the change-over valve 35 opens the passage on the orifice 36 side and closes the passage on the air pump 31 side. When turned OFF, the change-over valve 35 closes the passage on the orifice 36 side and opens the passage on the air pump 31 side. When the change-over valve 35 is switched so as to open the passage on the orifice 36 side, a very small flow path is ensured by the orifice 36. The trap canister 37 serves to trap fuel vapor in the event of leakage of the vapor from the canister 8.

In this embodiment, an electronic control unit (ECU) 30 is provided for controlling the fuel vapor processing apparatus and the failure diagnostic system. The sensors 21 to 26 referred to above are connected to the ECU 30. The vapor control valve 9, purge control valve 14 and change-over valve 35 are also connected to the ECU 30. For controlling the fuel vapor processing apparatus and the failure diagnostic system in accordance with an operating condition of the engine 1, the ECU 30 controls the valves 9, 14, and 35 based on detected signals from the sensors 21 to 26. The ECU 30 used in this embodiment corresponds to first and second diagnostic means in the present invention.

As known well, the ECU 30 includes a central processing unit (CPU), a read-only memory (ROM), a random access memory (RAM), a backup RAM, an external input circuit, and an external output circuit. Various control programs and predetermined data are stored beforehand in the ROM. Results of operations carried out by the CPU are stored temporarily in the RAM. Pre-stored data is stored in the backup RAM. In accordance with detected signals transmitted from the sensors 21 to 26 through the input circuit, the CPU executes various controls concerned with the fuel vapor processing apparatus and the failure diagnostic system.

Figure 2:
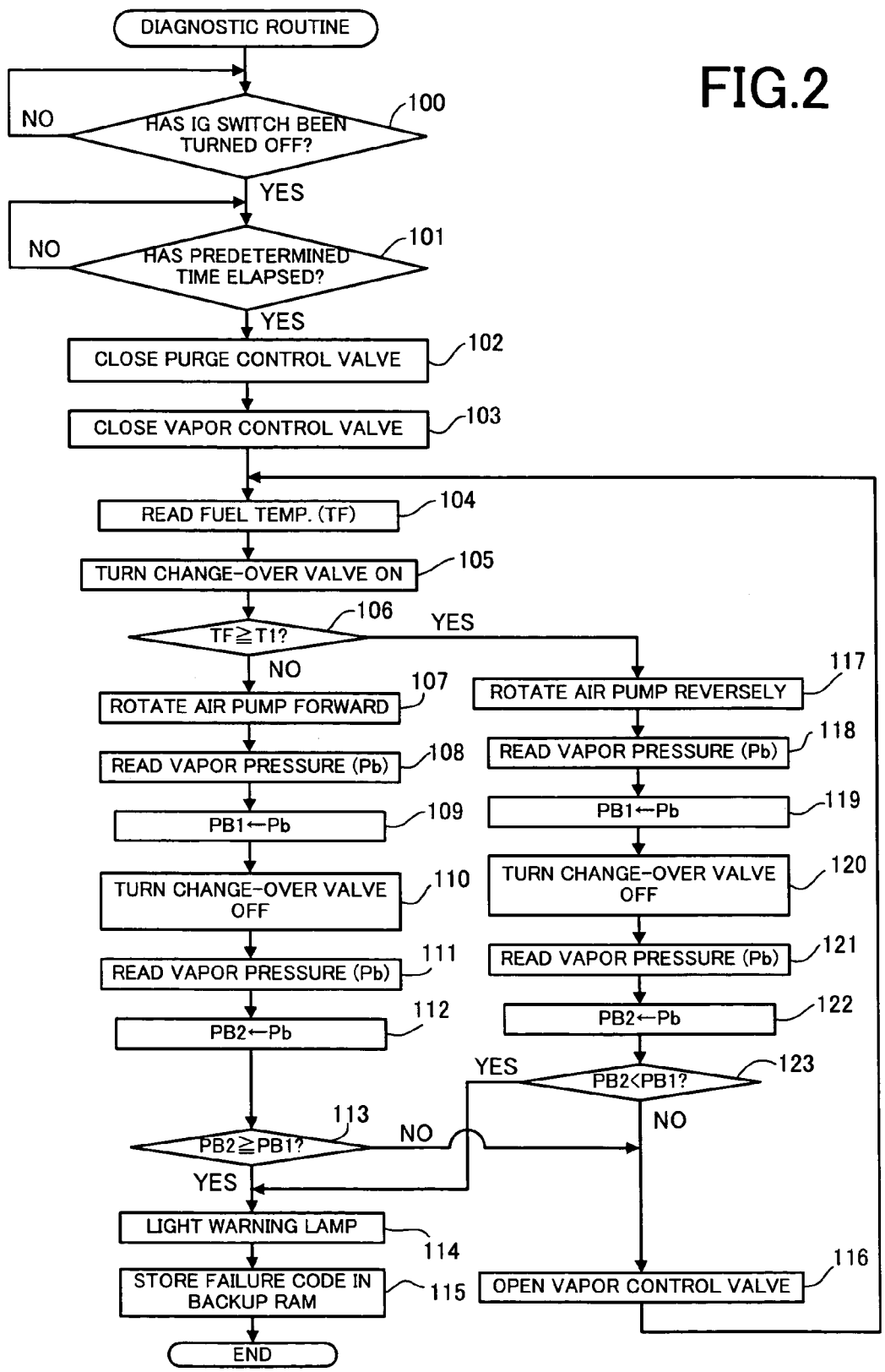
FIG. 2 is a flowchart showing a diagnostic routine.

Next, a description will be given about the contents of controls which the ECU 30 executes in connection with failure diagnosis and vapor processing. FIG. 2 shows a control program on the failure diagnosis in terms of a flowchart (diagnostic routine). The ECU 30 executes this routine periodically at every predetermined time intervals.

First, the ECU 30 waits for turning OFF of the IG switch 24 in step 100, and upon turning OFF of the switch 24, waits for the lapse of a predetermined time, (e.g., 5 hours) in step 101.

Upon lapse of the predetermined time in step 101, the ECU 30 closes the purge control valve 14 in step 102 and closes the vapor control valve 9 in step 103. As a result, the processing flow path including the purge line 13 from the purge control valve 14 to the canister 8, the canister 8, and the vapor line 7 from the canister 8 to the purge control valve 9 is closed off.

Thereafter, in step 104, the ECU 30 reads the intra-tank fuel temperature TF detected by the temperature sensor 26.

Then, in step 105, the ECU 30 turns the change-over valve 35 ON. As a result, the passage on the orifice 36 side opens and the passage on the air pump 31 side closes.

In step 106, the ECU 30 determines whether the intra-tank fuel temperature TF is not lower than a predetermined threshold value T1(e.g., 35° C.). If a negative decision is made, that is, if the intra-tank fuel temperature TF is lower than the threshold value T1, the ECU 30 causes the DC motor of the air pump 31 to rotate forward. As a result, the air pump 31 sucks in air from the interior of the foregoing processing flow path and reduces the internal pressure of processing flow path (by applying a negative pressure).

Subsequently, in step 108, the ECU 30 reads the vapor pressure Pb detected by the vapor pressure sensor 25, then in step 109 sets the read vapor pressure Pb as a pre-read value PB1.

In step 110, the ECU 30 turns the change-over valve 35 OFF. As a result, the passage on the orifice 36 side closes and the passage on the air pump 31 side opens.

Thereafter, in step 111, the ECU 30 reads the vapor pressure Pb detected by the vapor pressure sensor 25, then in step 112 sets the inputted vapor pressure Pb as a post-read value PB2.

Next, in step 113, the ECU 30 determines whether the post-read value PB2 is not smaller than the pre-read value PB1. If an affirmative decision is made, the ECU 30 determines that the processing flow path involves a failure in air-tightness, and then shifts the processing to step 114.

In step 114, the ECU 30 lights the warning lamp 15 for informing the occurrence of a failure, then in step 115 causes a failure code which indicates the presence of a failure to be stored in the backup RAM, and once terminates the processing. At the time of inspection of the automobile, the failure code is read out as failure history data.

If a negative decision is made in step 113, the ECU 30 determines that the processing flow path involves no failure in air-tightness, then in step 116 the ECU 30 causes the vapor control valve 9 to be opened, shifts the processing to step 104 and again repeats the processing of step 104 and subsequent steps.

On the other hand, if an affirmative decision is made in step 106, that is, if the intra-tank fuel temperature TF is not lower than the threshold value T1, the ECU 30 causes the DC motor of the air pump 31 to rotate reversely in step 117. As a result, air is discharged into the processing flow path (by applying a positive pressure) to pressurize the interior of the processing flow path.

Subsequently, in step 118, the ECU 30 reads the vapor pressure Pb detected by the vapor pressure sensor 25, then in step 119 sets the read vapor pressure Pb as a pre-read value PB1.

In step 120, the ECU 30 turns the change-over valve 35 OFF. As a result, the passage on the orifice 36 side closes and the passage on the air pump 31 side opens.

Thereafter, in step 121, the ECU 30 reads the vapor pressure Pb detected by the vapor pressure sensor 25, then in step 122 sets the inputted vapor pressure Pb as a post-read value PB2.

Next, in step 123, the ECU 30 determines whether or not the post-read value PB2 is smaller than the pre-read value PB1. If an affirmative decision is made, the ECU 30 determines that the processing flow path involves a failure in air-tightness, then shifts the processing to step 114 and executes the foregoing processing of steps 114 and 115.

If a negative decision is made in step 123, the ECU 30 determines that the processing flow path involves no failure in air-tightness, then in step 116 the ECU 30 causes the vapor control valve 9 to be opened, shifts the processing to step 104 and again repeats the processing of step 104 and subsequent steps.

Thus, in the above diagnostic routine, the ECU 30 controls the purge control valve 14 and the vapor control valve 9 to close off the processing flow path after stop of the engine 1. Then, when the intra-tank fuel temperature TF detected becomes less than the predetermined threshold value T1, the ECU 30 controls the air pump 31 to reduce the internal pressure of the processing flow path. Further, the ECU 30 checks the air-tightness of the processing flow path based on behavior of the purge pressure Pb which is detected after the pressure reduction. On the other hand, after stop of the engine, the ECU 30 controls the purge control valve 14 and the vapor control valve 9 to close off the processing flow path. Then, when the detected intra-tank fuel temperature TF is not less than the predetermined threshold value T1, the ECU 30 controls the air pump 31 to pressurize the interior of the processing flow path. Further, the ECU 30 checks the air-tightness of the processing flow path based on behavior of the purge pressure Pb which is detected after the pressurization.

Figure 3:
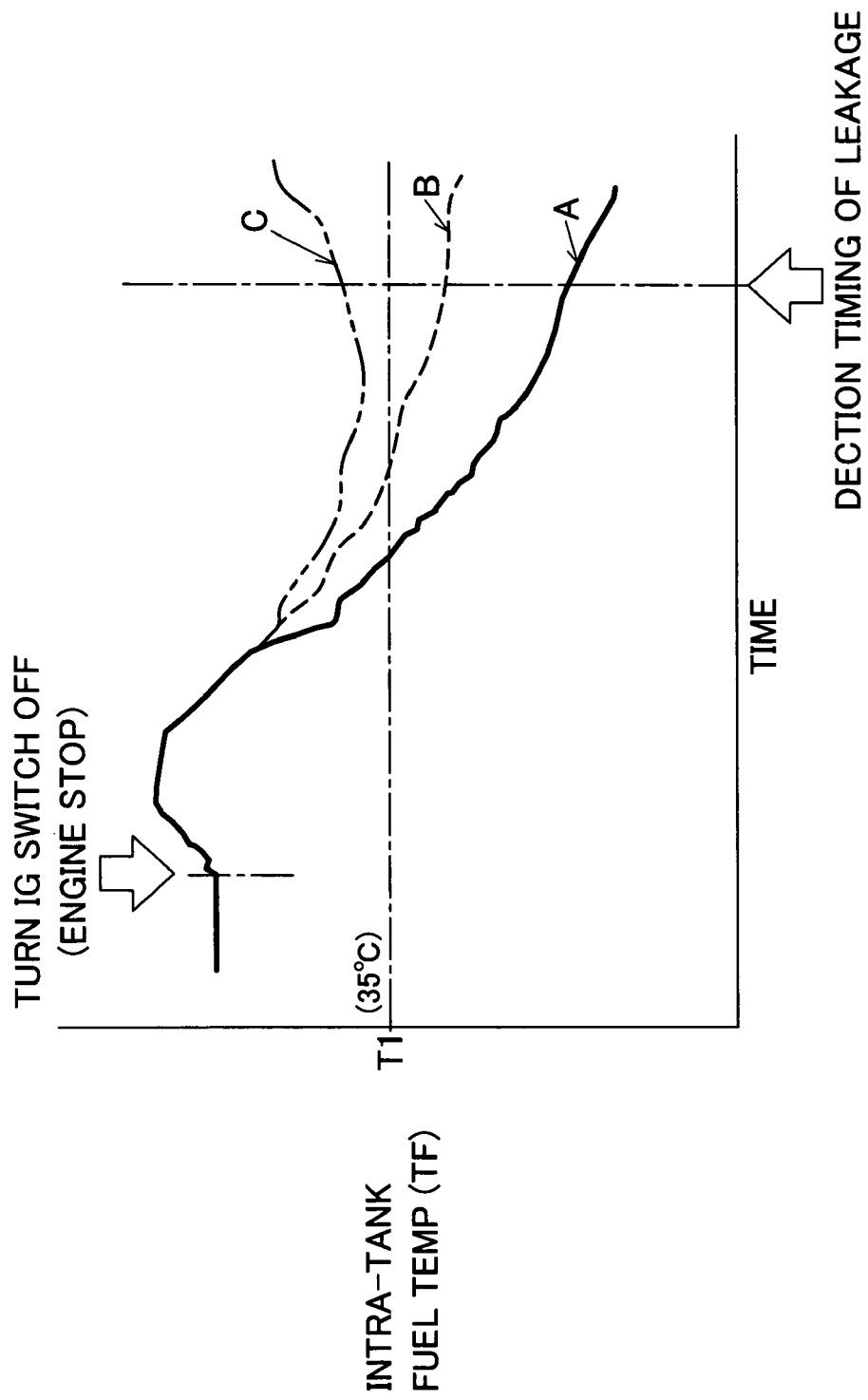
FIG. 3 is a graph showing changes with time in fuel temperature within a tank under different conditions.

FIG. 3 is a graph showing changes with time of the intra-tank fuel temperature TF under different conditions. In the same figure, a solid line A represents changes observed when the automobile was parked on a road after traveling in a winter night. It is seen that when the IG switch 24 is turned OFF to stop the engine 1, the intra-tank fuel temperature TF once rises, but soon drops to be lower than the threshold value T1. A broken line B in FIG. 3 represents changes observed when the automobile was stopped in a garage after running in around spring or autumn. It is seen that just after stop of the engine 1, the intra-tank fuel temperature TF once rises like the solid line A, but drops somewhat gentler than the solid line A and becomes lower than the threshold value T1. A dash-double dot line C in FIG. 3 represents changes observed when the automobile was parked on an asphalt road after traveling under the burning sun. It is seen that the intra-tank fuel temperature TF once rises just after stop of the engine 1 like the solid line A and the broken line B, but drops gentler than the broken line B and then rises without becoming lower than the threshold value T1. In FIG. 3, therefore, if the threshold value T1 is set at "35° C.," then in the case of the solid line A, leakage is detected at the "leakage detection timing" in terms of a negative pressure at a temperature of "35° C." or less. In the case of the broken line B, leakage is detected at the "leakage detection timing" in terms of a negative pressure also at a temperature of "35° C." or less. On the other hand, in the case of the dash-double dot line C, leakage is detected at the "leakage detection timing" in terms of a positive pressure at a temperature of "35° C." or more.

Figure 4:
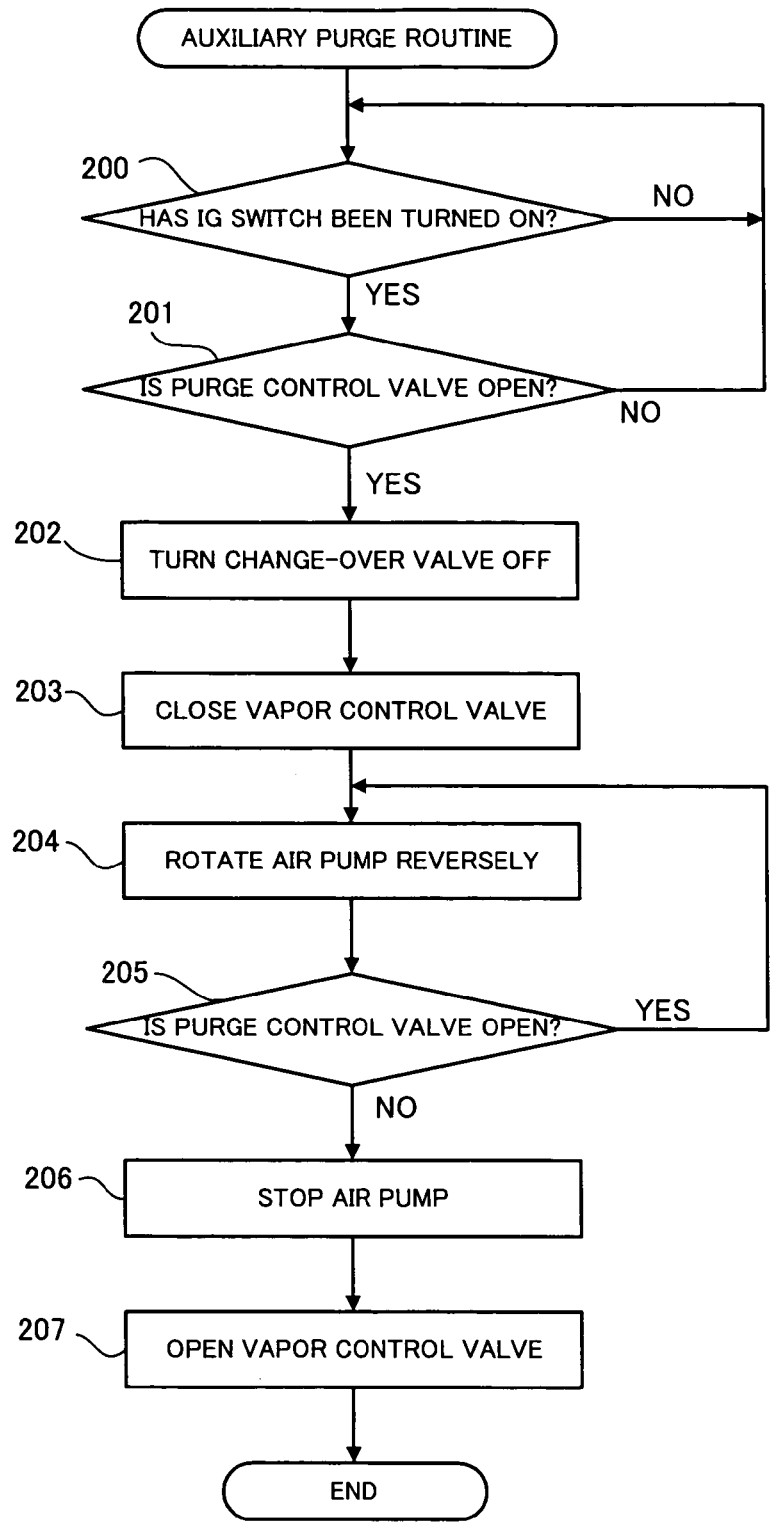
FIG. 4 is a flowchart showing an auxiliary purge routine.

FIG. 4 shows a purge control program in terms of a flowchart (an auxiliary purge routine). The ECU 30 executes this routine periodically at every predetermined time intervals.

In step 200, the ECU 30 waits for turning ON of the IG switch 24, and upon turning ON of the switch 24, shifts the processing to step 201.

In step 201, the ECU 30 waits for opening of the purge control valve 14, and when the valve 14 is opened, the ECU 30 shifts the processing to step 202.

In step 202, the ECU 30 turns the change-over valve 35 OFF. As a result, the passage on the orifice 36 side closes and the passage on the air pump 31 side opens.

In step 203, the ECU 30 closes the vapor control valve 9. As a result, the communication with the fuel tank 4 is cut off.

Then, in step 204, the ECU 30 causes the DC motor of the air pump 31 to rotate in a reverse direction. As a result, air is discharged into the canister 8 to pressurize the interior of the canister. By this pressurization, splitting-off of the vapor adsorbed on the adsorbent 10 in the canister 8 from the adsorbent 10 is accelerated to assist purging of the vapor.

Thereafter, in step 205, the ECU 30 determines whether the purge control valve 14 is open or not. If an affirmative decision is obtained, the ECU 30 returns the processing to step 204. In contrast therewith, if a negative decision is obtained in step 205, the ECU 30 shifts the processing to step 206.

Next, in step 206, the ECU 30 stops the operation of the air pump 31, then in step 207 opens the vapor control valve 9 and once terminates the processing.

According to the failure diagnostic system for the fuel vapor processing apparatus in this embodiment described above, after stop of the engine 1, the vapor control valve 9 and the purge control valve 14 are closed by the ECU 30 to close off the processing flow path including the canister 8 and the vapor line 7 and purge line 13. Further, when the detected intra-tank fuel temperature TF is lower than the predetermined threshold value T1, the air pump 31 is rotated forward by the ECU 30 to reduce the internal pressure of the processing flow path. After this pressure reduction, the air-tightness of the processing flow path is checked by the ECU 30 based on behavior of the detected vapor pressure Pb in the processing flow path. More particularly, if a pressure change of not smaller than the pre-read value PB1 occurs within the processing flow path which has become negative in pressure by the pressure reduction, it is determined that there exists a failure in air-tightness such as a hole being formed in the processing flow path. The failure diagnostic system performs diagnosis by reducing the internal pressure of the processing flow path into a negative pressure, so even if a hole should be formed in the processing flow path, there is no fear of vapor leakage from the hole during diagnosis.

On the other hand, when the vapor control valve 9 and the purge control valve 14 are closed to close off the processing flow path after stop of the engine 1 and the detected intra-tank fuel temperature TF becomes the predetermined threshold value T1 or higher, the air pump 31 is rotated reversely by the ECU 30 to pressurize the interior of the processing flow path. After the pressurization, the air-tightness of the processing flow path is checked by the ECU 30 based on behavior of the detected purge pressure Pb in the processing flow path. More specifically, in the case where a change in pressure smaller than the pre-read value PB1 occurs within the processing flow path the pressure of which has been made positive by the pressurization, it is determined that an air-tightness failure such as the formation of a vapor leaking hole is present in the processing flow path. Thus, in the failure diagnostic system, the interior of the processing flow path is pressurized only when the intra-tank fuel temperature TF is not lower than the threshold value T1, so even in the event a hole or the like should be formed in the processing flow path, it is less likely for the fuel vapor to leak to the outside through the hole or the like upon pressurization. In the failure diagnostic system, moreover, at such a high temperature as causes a large amount of vapor to be produced in the fuel tank 4, the time required for pressurizing the interior of the processing flow path becomes shorter and so does the time required for diagnosis.

According to the failure diagnostic system of this embodiment, as described above, since in many cases diagnosis is performed while keeping the internal pressure of the processing flow path negative and it is less frequent that the internal pressure of the processing flow path is set positive during diagnosis, it is possible to minimize the leakage of vapor to the outside during diagnosis. Besides, at such a high temperature as causes a large amount of vapor to be developed in the fuel tank 4, the internal pressure of the processing flow path is made positive during diagnosis, so that diagnosis can be done positively in a shorter time than in case of making the internal pressure negative.

Moreover, according to the failure diagnostic system of this embodiment, since one air pump 31 is used for both reducing the internal pressure of the processing flow path and pressurizing the interior of the same flow path, it is not necessary to use two pumps for the two purposes, that is, the number of components of the failure diagnostic system becomes smaller. Consequently, the construction of the failure diagnostic system including the pump module 12 can be simplified and reduced in size and hence it is possible to improve the on-vehicle mountability of the failure diagnostic system.

Further, in the fuel vapor processing apparatus according to the present embodiment, by executing the "auxiliary purge routine" with use of the pump module 12 included in the failure diagnostic system, it is possible to assist purging the vapor adsorbed in the canister 8. Consequently, the vapor adsorbed in the canister 8 can be purged positively. Therefore, even if the canister 8 becomes saturated with vapor, the vapor adsorbing capacity of the canister 8 can be recovered repeatedly by purging the vapor positively from the canister 8 as described above.

The present invention is not limited to the above embodiment, but may be carried out in the following manner within the scope not departing from the gist of the invention. For example, although in the above first embodiment the means for reducing the internal pressure of the processing flow path and the means for pressurizing the interior of the same flow path are constituted by one air pump 31, both may be constituted by separate air pumps.

[Second Embodiment]

A fuel vapor processing apparatus including a canister and a failure diagnostic system therefor according to a second embodiment of the present invention will be described in detail hereinafter with reference to the accompanying drawings.

Figure 5:
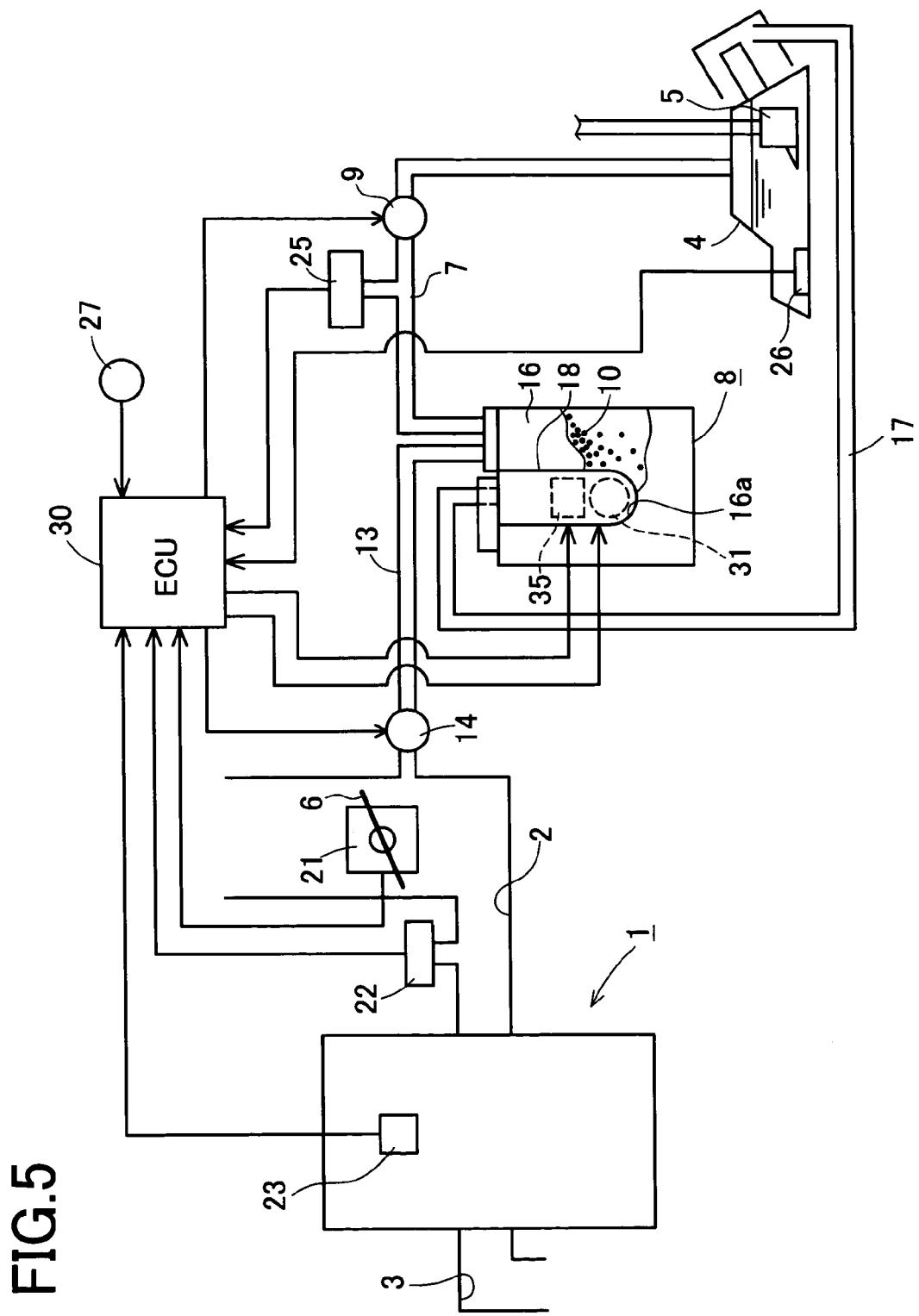
FIG. 5 is a schematic construction diagram of a fuel vapor processing apparatus and a failure diagnostic system therefor embodying the present invention.

FIG. 5 is a schematic construction diagram of the fuel vapor processing apparatus and the failure diagnostic system in the second embodiment both mounted on an automobile. In FIG. 5, the same components as in the first embodiment are identified by the same reference numerals as in the first embodiment, and explanations thereof will be omitted.

In this embodiment, a vehicle speed sensor 27 for detecting a vehicle speed SPD of the automobile is provided in the automobile. In this embodiment, a throttle sensor 21, an intake pressure sensor 22, a rotational speed sensor 23 and the vehicle speed sensor 27 correspond to the operating condition detecting means for detecting operating conditions of an engine 1 and the automobile.

A canister 8 used in this second embodiment includes a casing 16 in which an adsorbent 10 for adsorbing fuel vapor is contained. An air pipe 17 extends from the canister 8 and communicates with the atmosphere.

A pump module 18 as a diagnosing functional part for the fuel vapor processing apparatus is integrally assembled in a nearly central portion of the casing 16. The pump module 18 is used for sucking gas from the casing 16 and thereby reducing the internal pressure of a processing flow path which includes a vapor line 7, canister 8 and purge line 13 disposed between a fuel tank 4 and an intake passage 2. When the thus-reduced internal pressure of the processing flow path is higher than a predetermined value, it is determined that a leakage trouble is occurring in the fuel vapor processing apparatus.

Figure 6:
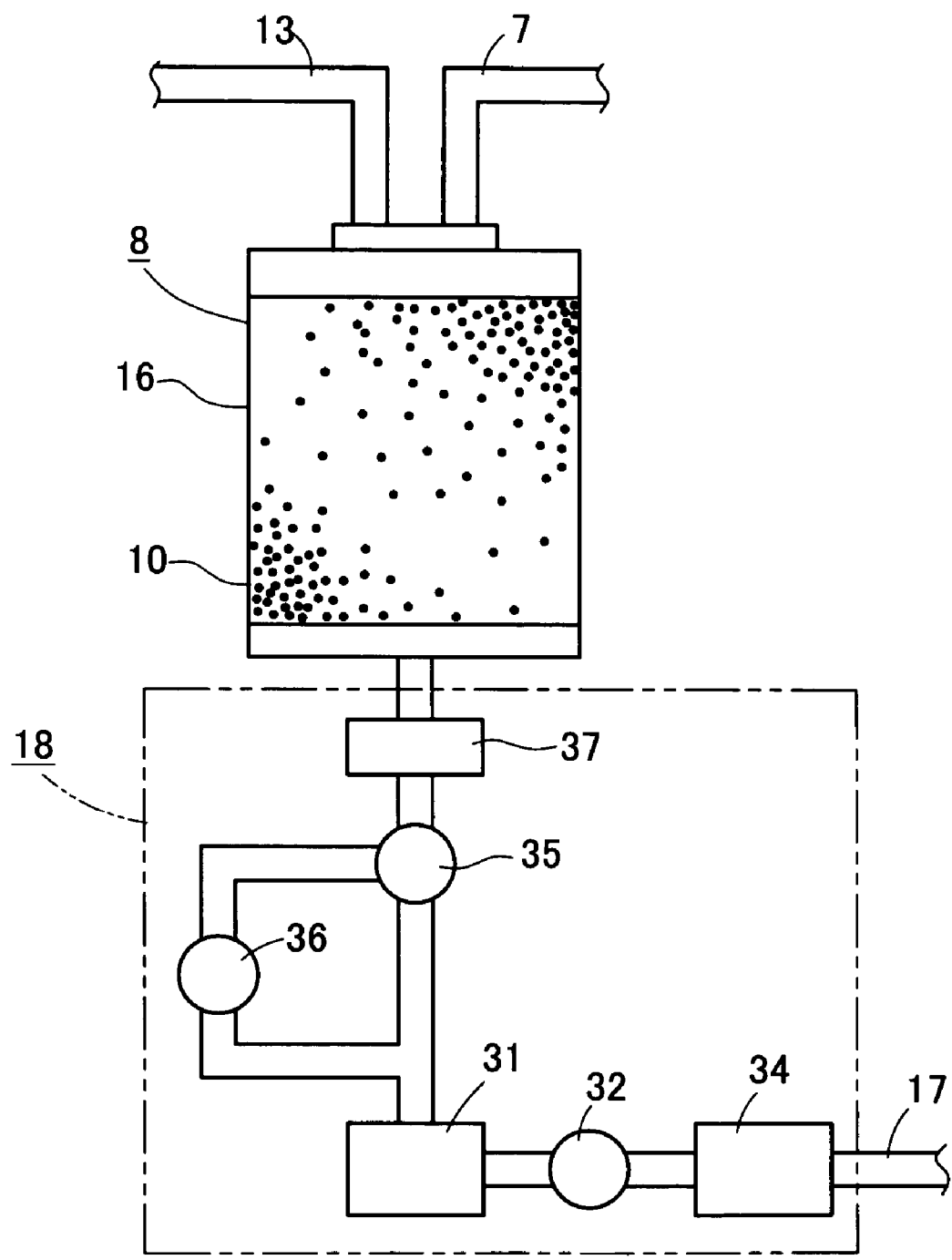
FIG. 6 is an equivalent construction diagram of a pump module and a casing.

FIG. 6 shows the construction of the pump module 18 illustrated in FIG. 5 and a relation between the pump module 18 and the casing 16 in terms of an equivalent construction diagram. As shown in FIG. 6, the pump module 18 includes an air pump 31, a check valve 32 and an air filter 34 both disposed on an air inlet side of the air pump 31, as well as a change-over valve 35, an orifice 36 and a trap canister 37 which are disposed on an air outlet side of the air pump 31. The check valve 32 is used for blocking the flow of gas from the air pump 31 toward the atmosphere. The air pump 31 is used for generating a suction force to develop a negative pressure for the casing 16. The orifice 36 is used for ensuring a very small communication between the air pump 31 and the casing 16 when the change-over valve 35 closes.

Various sensors 21 to 23 and 25 to 27 referred to previously are connected to an ECU 30. A vapor control valve 9, a purge control valve 14, the air pump 31 and the change-over valve 35 are also connected to the ECU 30. For controlling the fuel vapor processing apparatus and the failure diagnostic system in accordance with an operating condition of the engine 1, the ECU 30 controls the valves 9, 14, 35 and the air pump 31 based on detected signals from the sensors 21 to 23 and 25 to 27.

Figure 7:
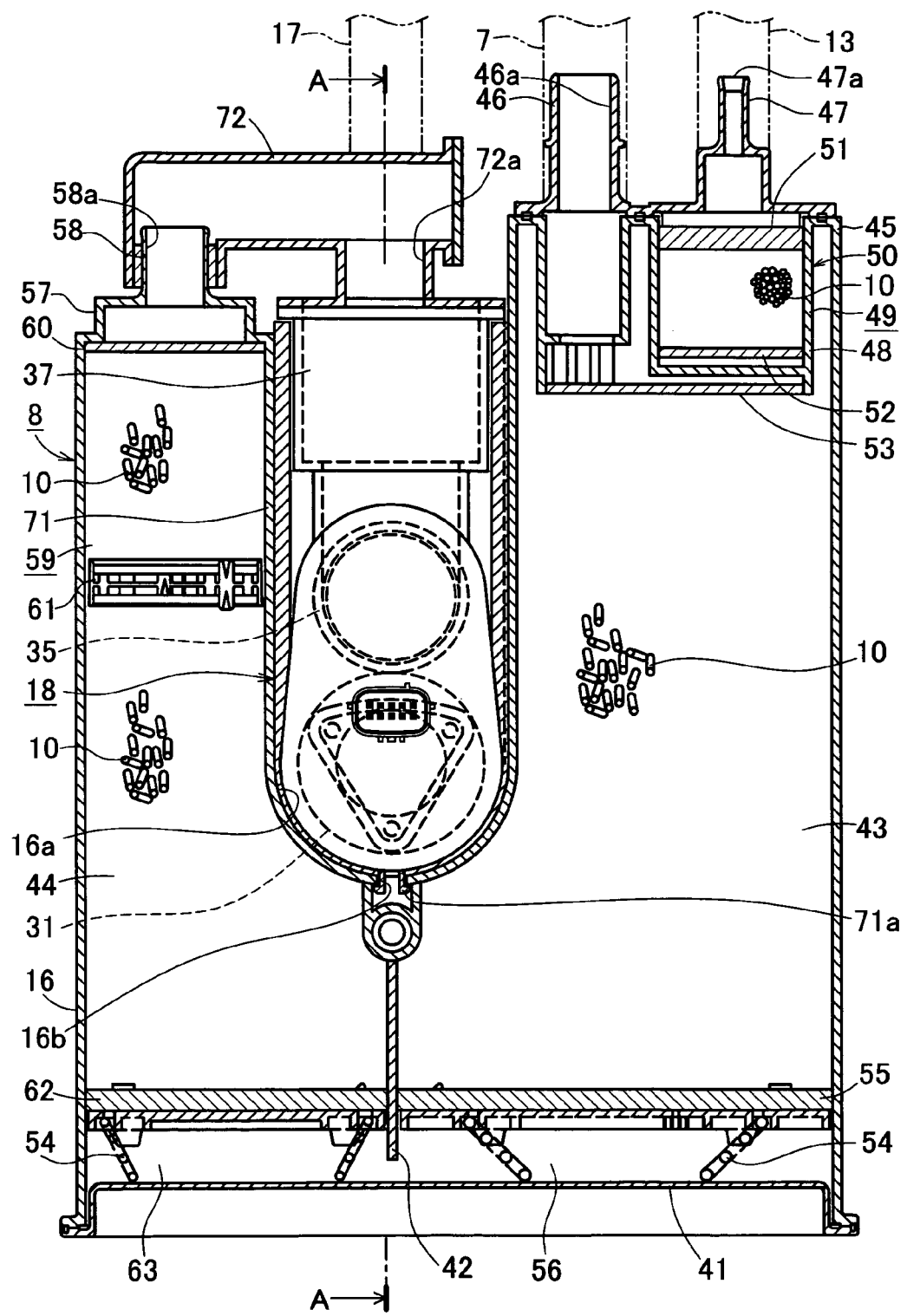
FIG. 7 is a sectional front view of a canister.
Figure 8:
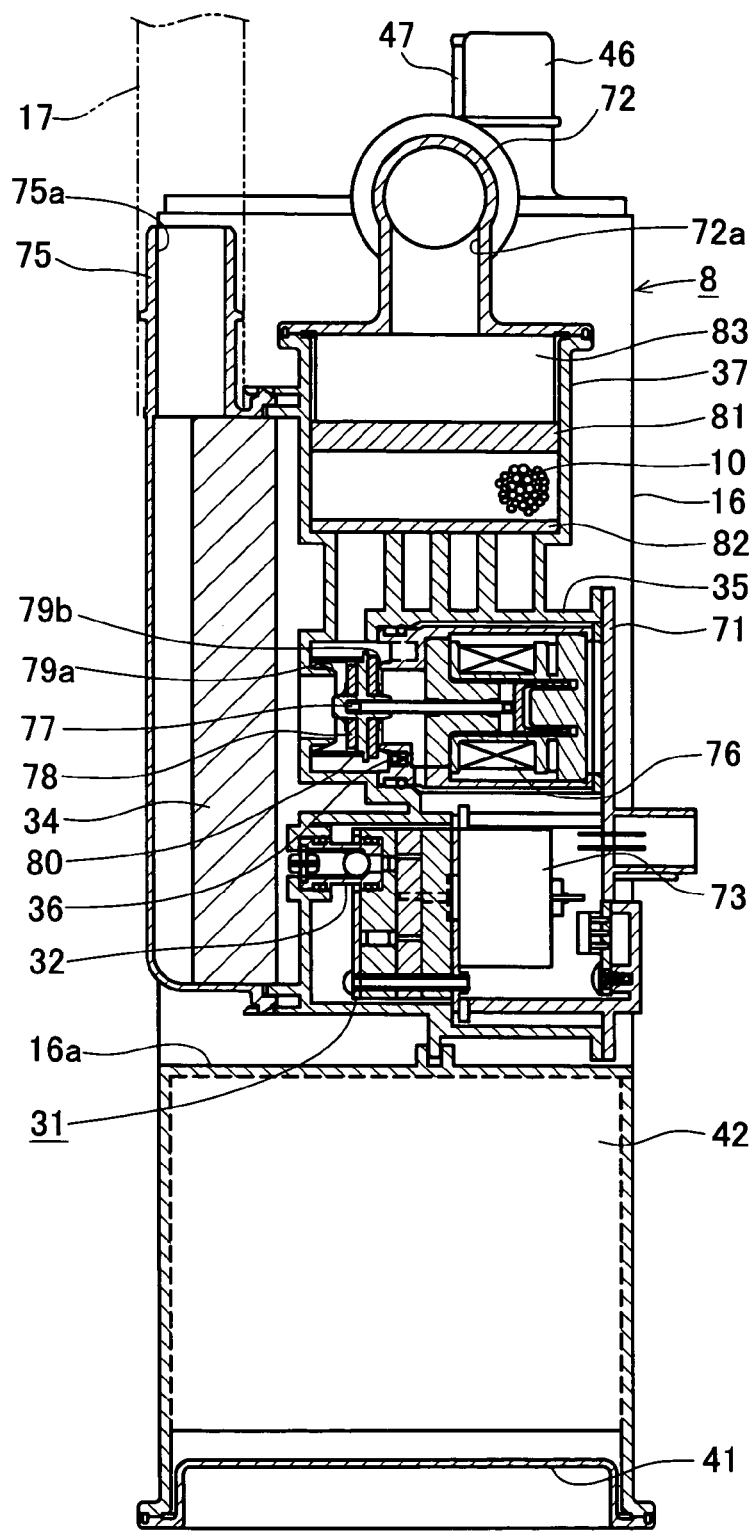
FIG. 8 is a sectional view taken on line A—A in FIG. 7.
Figure 9:
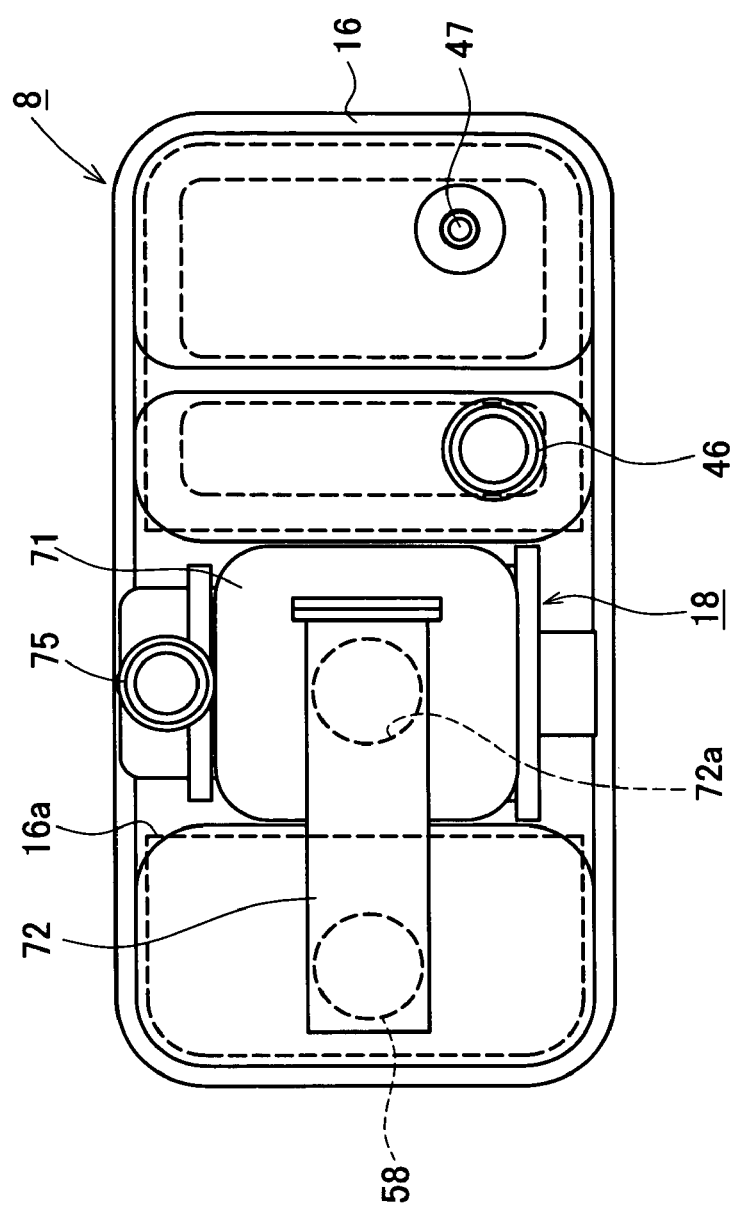
FIG. 9 is a plan view of the canister.
Figure 10:
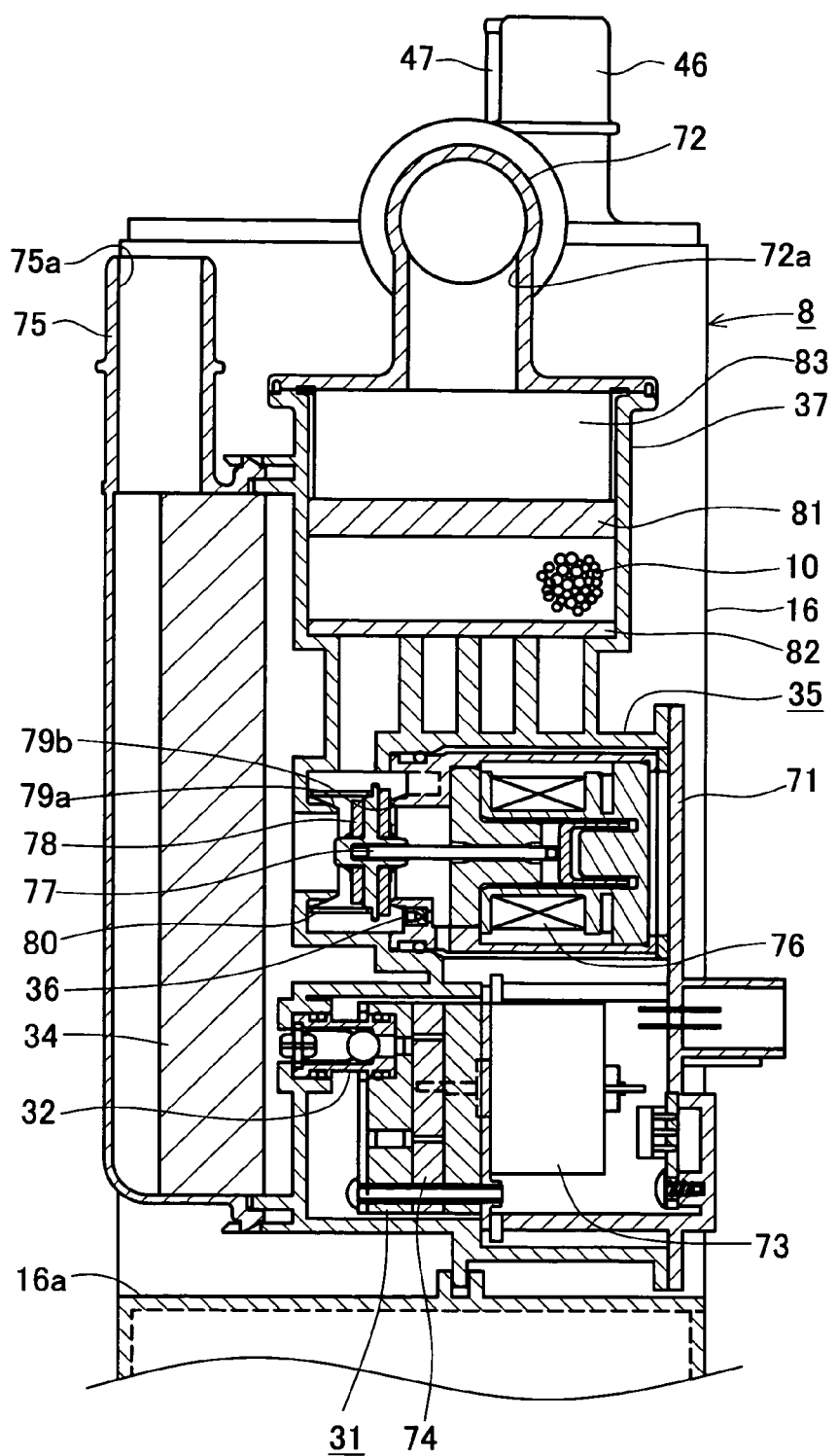
FIG. 10 is an enlarged sectional view showing a principal portion of FIG. 8.

The construction of the canister 8 and that of the pump module 18 will be described in detail below with reference to FIGS. 7 to 10. FIG. 7 is a sectional front view of the canister 8. FIG. 8 is a sectional view taken along line A—A in FIG. 7. FIG. 9 is a plan view of the canister 8. FIG. 10 is an enlarged sectional view of a principal portion of FIG. 8.

As shown in FIG. 7, the whole of the casing 16 is in the shape of a substantially U-shaped cylindrical body, which is nearly centrally formed with a U-shaped valley portion 16a. A lower portion of the casing 16 is closed with a bottom plate 41. The interior of the casing 16 is partitioned into a first chamber 43 and a second chamber 44 by means of a partition plate 42 disposed correspondingly to a central part of the valley portion 16a.

Vapor is introduced into and discharged from the first chamber 43 through one end portion of the generally U-shaped cylindrical body, i.e., a first end portion 45 corresponding to an upper portion of the first chamber 43. The first end portion 45 is connected to the fuel tank 4 through the vapor line 7. A vapor line joint 46 including a tank port 46a and a purge line joint 47 including a purge port 47a and connected to the purge line 13 are provided on the first end portion 45. An inner sleeve 48 is formed in the first end portion 45. Within the inner sleeve 48 is provided a purge buffer canister 49 correspondingly to the purge port 47a. The canister 49 includes an inner case 50 and an adsorbent 10 (in FIG. 7 only a part thereof is illustrated for convenience, the same applies to the following adsorbents 10) which is contained in the inner case 50 in a sandwiched manner between a pair of upper and lower perforated plates 51, 52. A perforated plate 53 is attached to a lower-end opening of the inner sleeve 48. A perforated plate 55, which is supported by the bottom plate 41 through a spring 54, is disposed in a lower portion of the first chamber 43. A first air layer 56 is formed under the perforated plate 55. An adsorbent 10 is contained in the first chamber 43 in a sandwiched state between the upper perforated plate 53 and the lower perforated plate 55.

Another end portion of the generally U-shaped cylindrical body, i.e., a second end portion 57 corresponding to an upper portion of the second chamber 44, is formed so that it can communicate with the atmosphere. A pipe joint 58 which includes an air port 58a is provided on the second end portion 57. An air buffer canister 59 is provided in the upper portion of the second chamber 44 correspondingly to the air port 58a. The canister 59 contains an adsorbent 10 in a sandwiched state between an upper perforated plate 60 and a lower perforated block 61. A perforated plate 62, which is supported by the bottom plate 41 through a spring 54, is disposed in a lower portion of the second chamber 44. A second air layer 63 is formed under the perforated plate 62. The second air layer 63 and the first air layer 56 are in communication with each other. An adsorbent 10 is contained in the second chamber 44 in a sandwiched state between the perforated block 61 located on the upper side and the perforated plate 62 located on the lower side.

The pump module 18 is mounted in the bottom 16a of the casing 16. As shown in FIG. 7, the pump module 18 includes the trap canister 37, change-over valve 35 and air pump 31 which are housed within a case 71. An insertion hole 16b is formed in the bottom of the valley portion 16a. An engaging portion 71a is formed at a lower end of the case 71 of the pump module 18. A duct 72 which includes an air outlet port 72a is formed on top of the trap canister 37. The duct 72 extends laterally and is connected to the pipe joint 58.

For mounting the pump module 18 to the casing 16, the pump module 18 is brought down perpendicularly to the valley portion 16a of the casing 16. Then, the engaging portion 71a of the pump module 18 is inserted into and engaged with the insertion hole 16b formed in the valley portion 16a. At the same time, the dust 72 is connected to the pipe joint 58. As a result, the pump module 18 is mounted to the casing 16.

As shown in FIGS. 8 and 10, the air pump 31 includes a DC motor 73 and vanes 74 which are rotated by the motor 73. A check valve 32 is disposed on an air inlet side of the air pump 31. An air filter 34 made of urethane is disposed upstream of the check valve 32. The air filter 34 is disposed in the longitudinal direction of the case 71. An air pipe joint 75 is disposed upstream of the air filter 34. The air pipe joint 75 includes an air inlet port 75a connected to the air pipe 17. For preventing deposition of foreign matters on the air filter 34 in a mounted state of the canister 8 on the automobile, it is preferable that the air pipe joint 75 be disposed at a lower position than the air filter 34 and be installed on the ground side.

The change-over valve 35 includes a solenoid 76, a valve rod 77 which is actuated by the solenoid 76, a valve body 78 fixed to an end of the valve rod 77, valve seats 79a and 79b adapted for engagement with the valve body 78, and a spring 80 which urges the valve body 78 in one direction. An orifice 36 is formed in part of the case 71 which constitutes the change-over valve 35.

The trap canister 37 is constituted by an adsorbent 10 which is contained in the interior of the case 71 in a sandwiched state between a pair of perforated plates 81 and 82. An air layer 83 which communicates with the air outlet port 72a is formed above one perforated plate 81.

Next, the flow of vapor, etc. in the canister 8 will be described below with reference to FIGS. 11 to 16.

Figure 11:
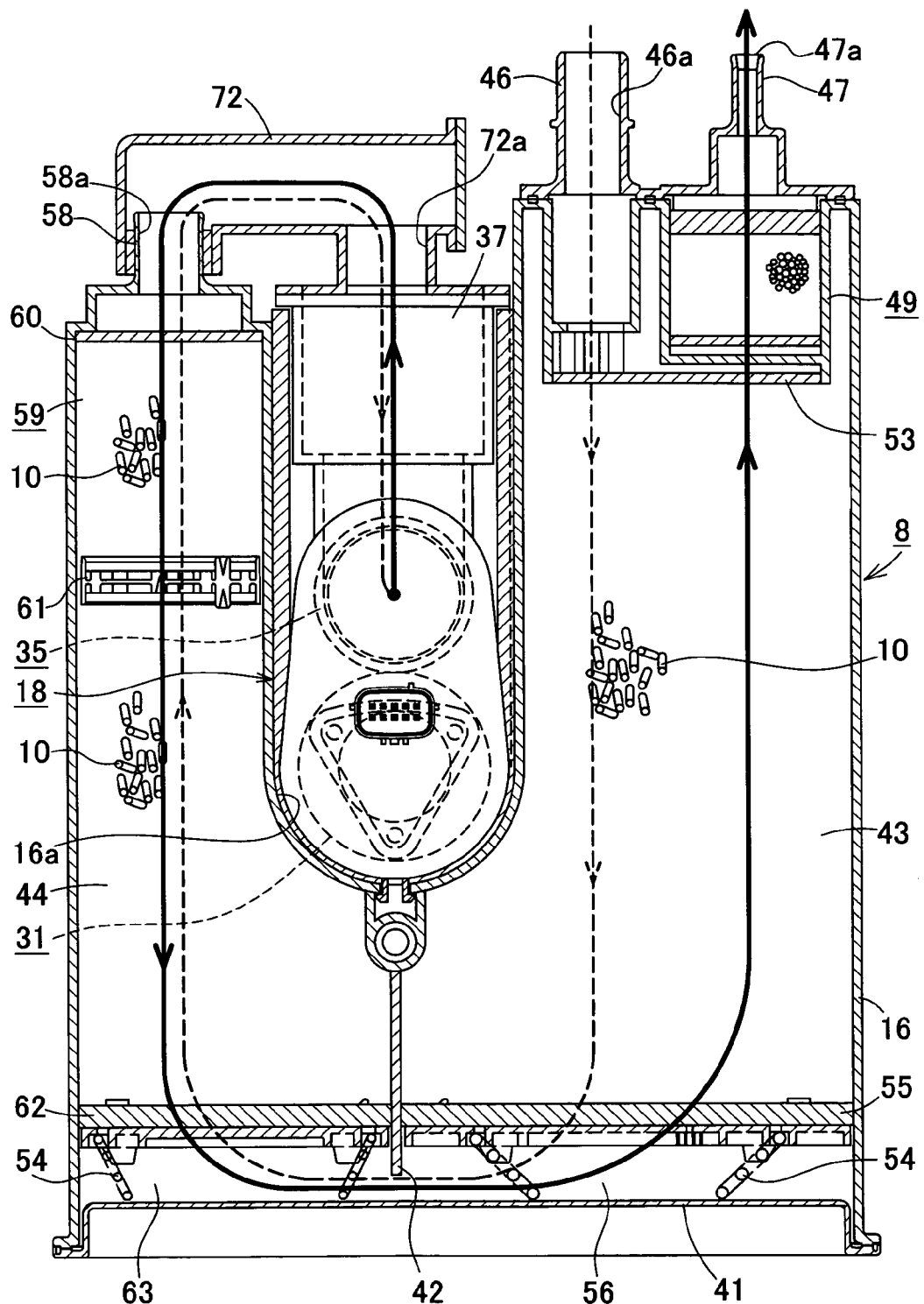
FIG. 11 is a sectional front view of the canister, showing a flow of vapor, etc.
Figure 12:
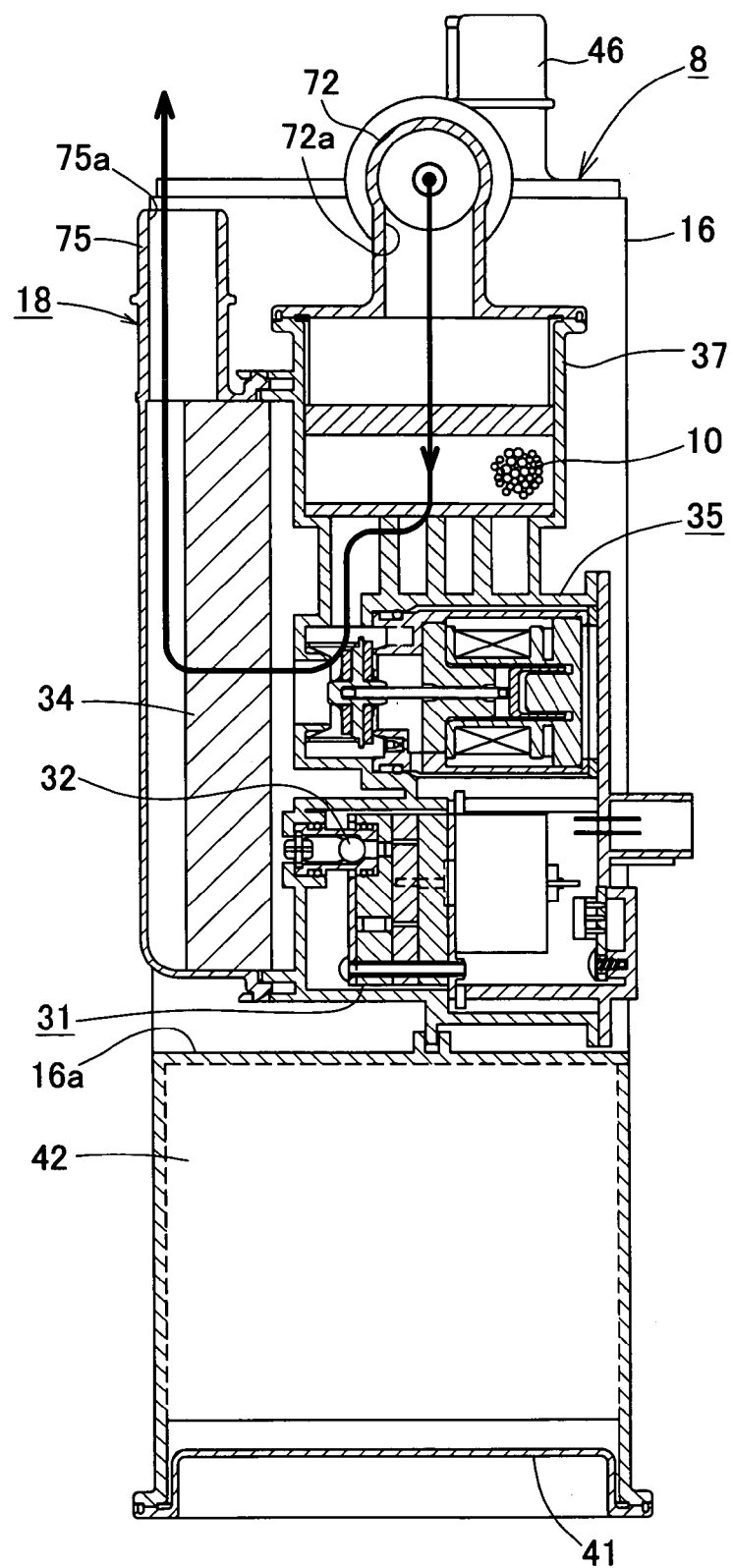
FIG. 12 is a sectional side view of the canister, showing a flow of vapor, etc.
Figure 13:
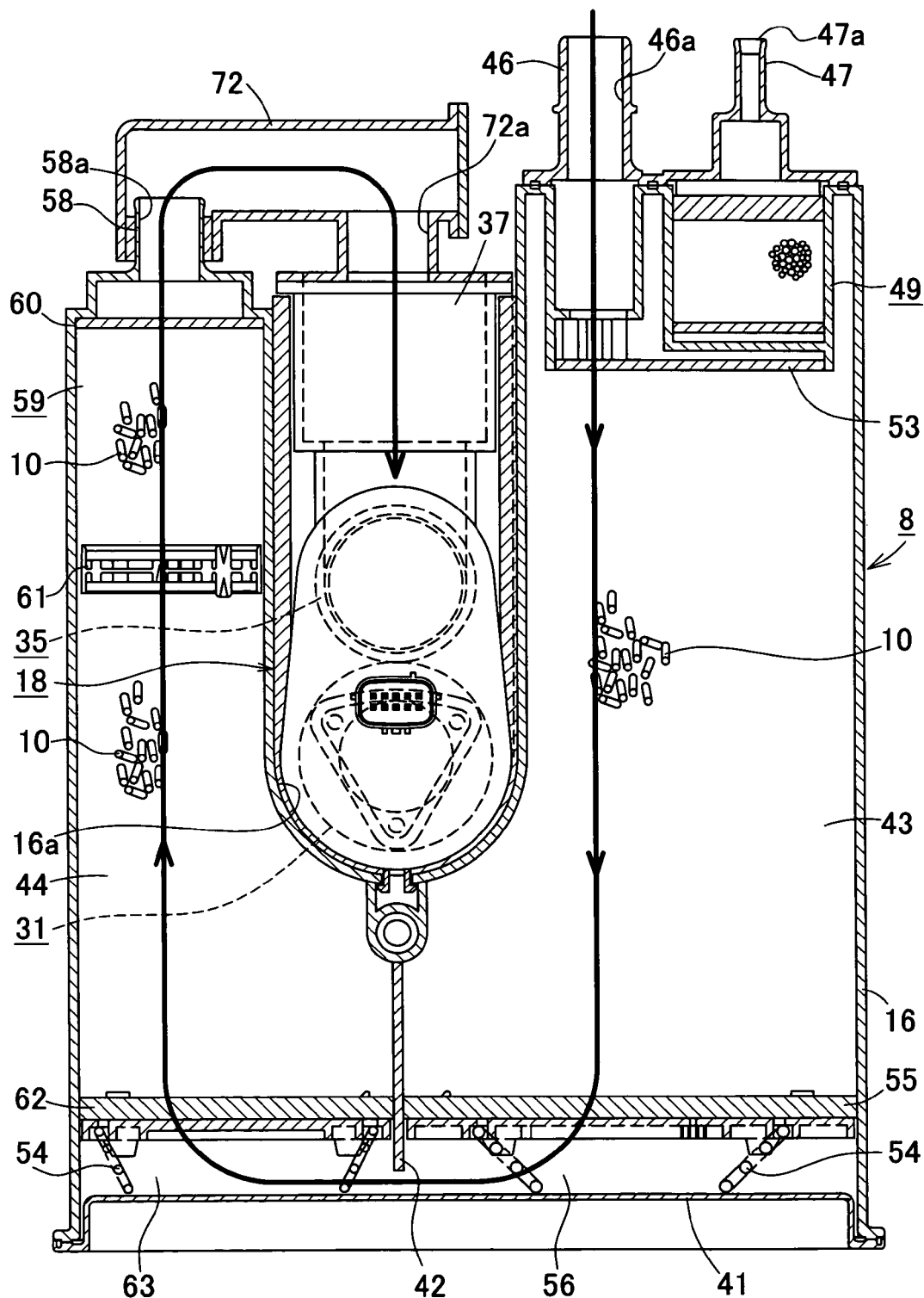
FIG. 13 is a sectional front view of the canister, showing a flow of vapor, etc.
Figure 14:
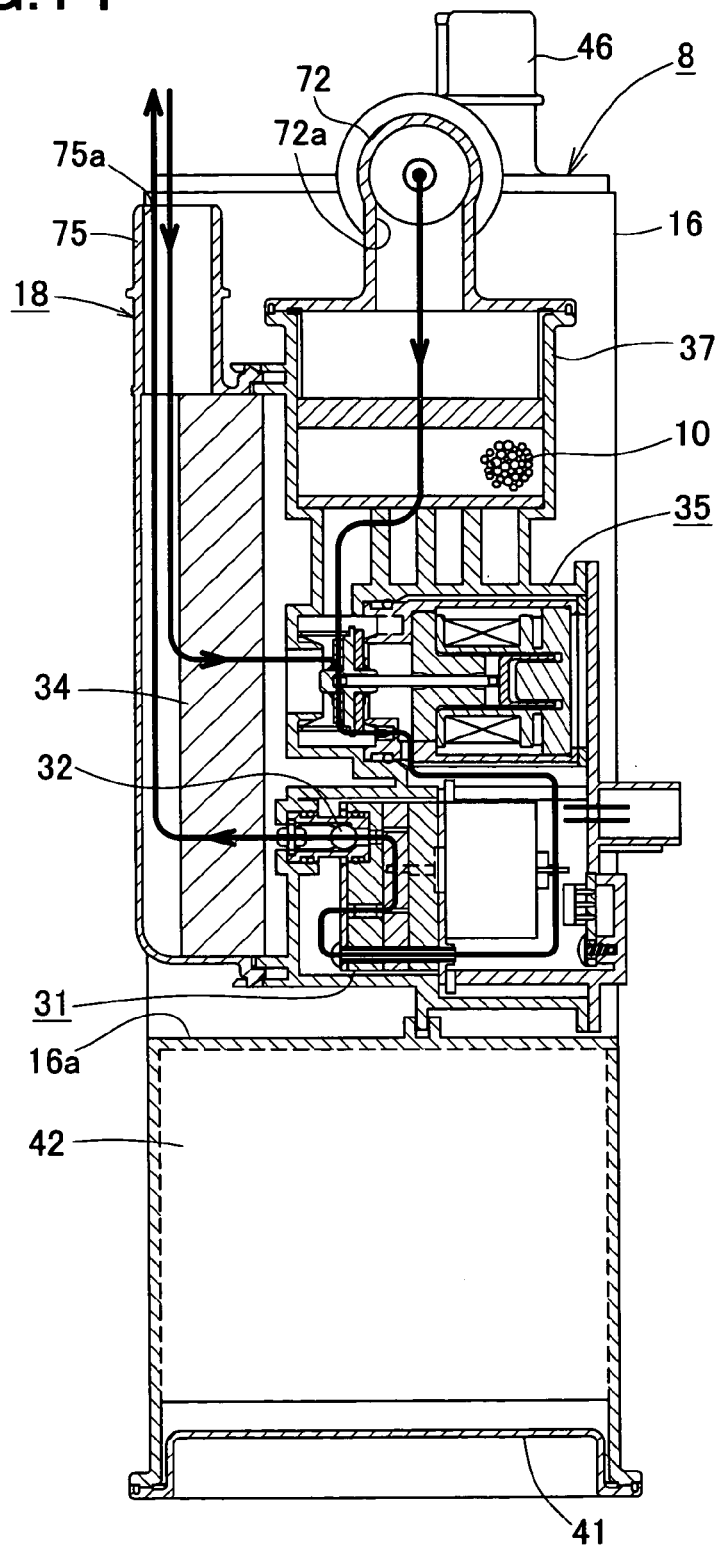
FIG. 14 is a sectional side view of the canister, showing a flow of vapor, etc.
Figure 15:
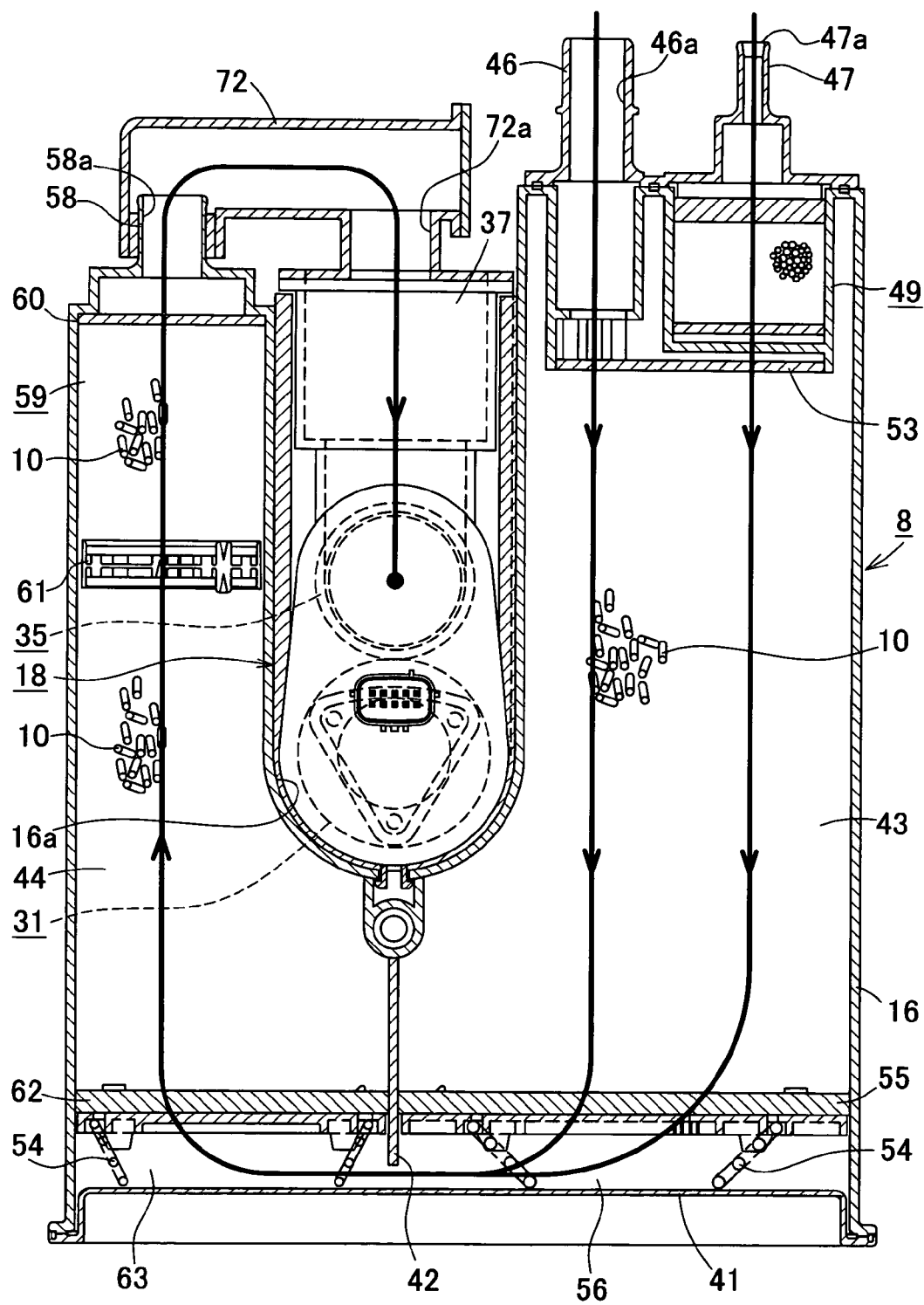
FIG. 15 is a sectional front view of the canister, showing a flow of vapor, etc.
Figure 16:
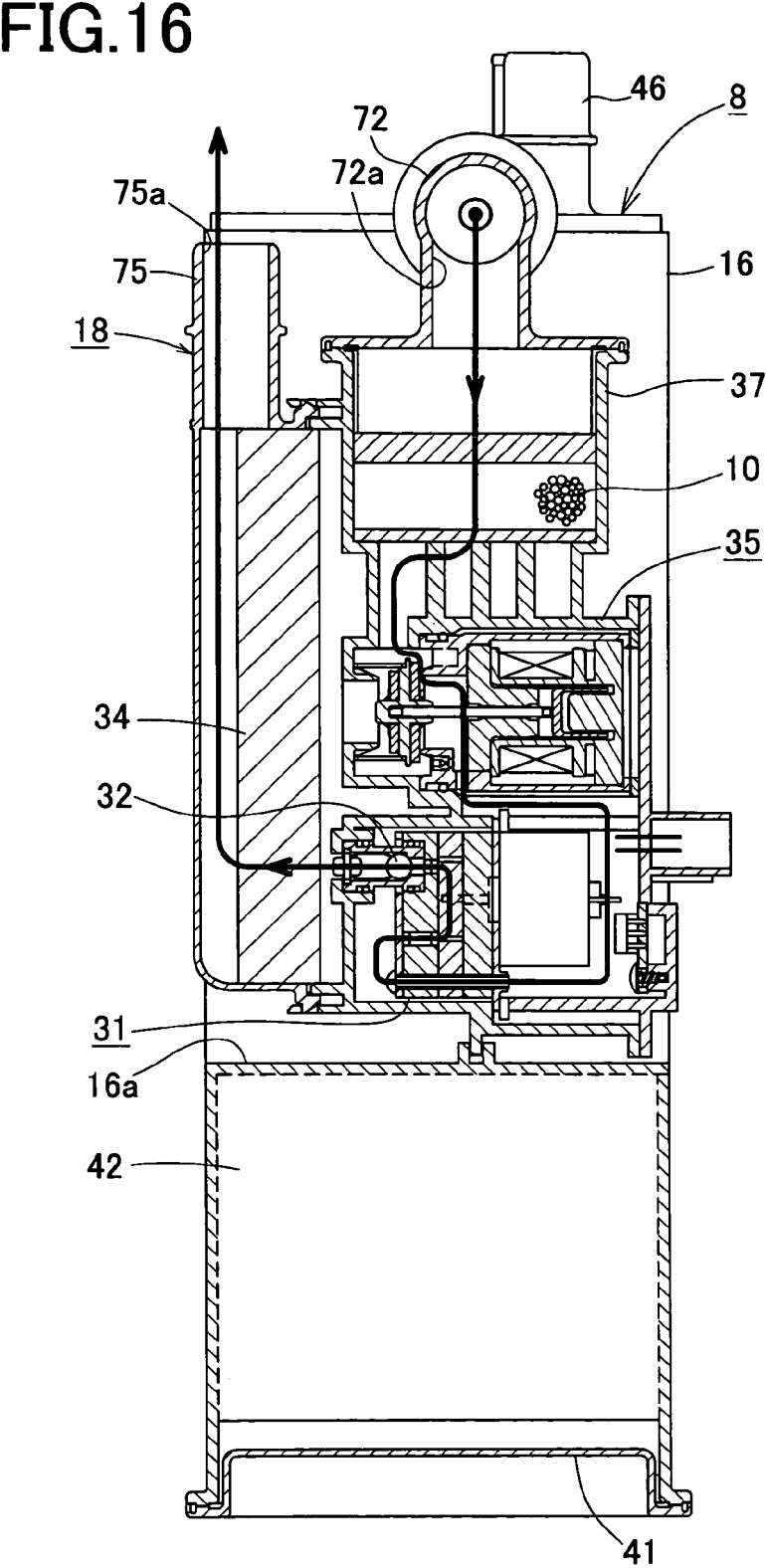
FIG. 16 is a sectional side view of the canister, showing a flow of vapor, etc.

When fuel is to be supplied to the fuel tank 4, the vapor control valve 9 is opened, whereby, as indicated with broken-line arrows in FIG. 11, fuel vapor developed in the fuel tank 4 flows through the tank port 46a, perforated plate 53, adsorbent 10 in the first chamber 43, perforated plate 55, first air layer 56, second air layer 63, perforated plate 62, adsorbent 10 in the second chamber 44, air buffer canister 59, air port 58a, duct 72 and air outlet port 72a successively in this order. At this time, a fuel component contained in the vapor is adsorbed on the adsorbent 10, so that the gas introduced from the air outlet port 72a into the pump module 18 contains little fuel component. Therefore, as indicated with solid-line arrows in FIG. 12, the gas introduced into the pump module 18 passes through the trap canister 37, change-over valve 35, air filter 34 and air inlet port 75a, which are disposed in the interior of the pump module 18, and is released to the atmosphere through the air pipe 17.

On the other hand, during travel of the automobile, the purge control valve 14 is opened, so that a negative pressure developed in the intake passage 2 passes through the purge line 13 and acts on the purge port 47a of the canister 8. With this negative pressure, the air flows through the pump module 18 in a direction opposite to the solid-line arrows in FIG. 12, further, as indicated with solid-line arrows in FIG. 11, flows through the air buffer canister 59, adsorbent 10 in the second chamber 44, perforated plate 62, second air layer 63, first air layer 56, perforated plate 55, adsorbent 10 in the first chamber 43, perforated plate 53, purge buffer canister 49 and purge port 47a successively in this order, then is conducted to the purge line 13. At this time, the fuel vapor (fuel component), which is adsorbed on the adsorbent 10 in the second chamber 44, first chamber 43, and the like, is attracted to the air flow, is conducted to the purge line 13, and is purged to the intake passage 2.

For obtaining reference data in failure diagnosis, the vapor control valve 9 is opened and the purge control valve 14 is closed. Then, the air pump 31 is operated to produce a negative pressure. This allows fuel vapor generated in the fuel tank 4 to flow, as indicated with solid-line arrows in FIG. 13, through the tank port 46a, perforated plate 53, adsorbent 10 in the first chamber 43, perforated plate 55, first air layer 56, second air layer 63, perforated plate 62, adsorbent 10 in the second chamber 44, air buffer canister 59, air port 58a, duct 72 and air outlet port 72a successively in this order. At this time, a fuel component contained in the vapor is adsorbed on the adsorbent 10, so that the gas introduced from the air outlet port 72a into the pump module 18 contains little fuel component. As indicated with solid-line arrows in FIG. 14, the gas introduced into the pump module 18 passes through the trap canister 37, change-over valve 35, orifice 36, air pump 31, check valve 32, air filter 34 and air inlet port 75a, which are disposed in the interior of the pump module 18, and is released to the atmosphere through the air pipe 17. At this time, the air introduced from the air inlet port 75a passes through the air filter 34, then in the change-over valve 35, joins the gas flowing from the trap canister 37.

In failure diagnosis, the vapor control valve 9 is opened and the purge control valve 14 is closed. Moreover, the change-over valve 35 is operated for change into a flow path not passing through the orifice 36. Further, the air pump 31 is operated to produce a negative pressure. As a result, the interior of the processing flow path including the vapor line 7 from the fuel tank 4 to the canister 8, the casing 16 of the canister 8, and the purge line 13 from the canister 8 to the purge control valve 14, is sealed hermetically. In this state, the negative pressure generated by the air pump 31 acts on the interior of the hermetically sealed processing flow path. At this time, as indicated with solid-line arrows in FIG. 15, the gas present within the hermetically sealed processing flow path flows from the tank port 46a to the perforated plate 53, from the purge port 47a to the perforated plate 53, then further flows through the adsorbent 10 in the first chamber 43, perforated plate 55, first air layer 56, second air layer 63, perforated plate 62, adsorbent 10 in the second chamber 44, air buffer canister 59, air port 58a, dust 72 and air outlet port 72a successively in this order. Further, as indicated with solid-line arrows in FIG. 16, the gas introduced into the pump module 18 flows through the trap canister 37, change-over valve 35, air pump 31, check valve 32, air filter 34 and air inlet port 75a, which are disposed in the interior of the pump module, and is released into the atmosphere through the air pipe 17. In this way the internal pressure of the hermetically sealed processing flow path is reduced by the negative pressure. By monitoring the pressure behavior in the interior of the hermetically sealed processing flow path, it is possible to check the air-tightness of the interior of the same flow path.

According to the canister 8 used in this embodiment described above, since the pump module 18 is integrally mounted in the valley portion 16a positioned nearly centrally of the casing 16, the pump module 18 does not project outward in the casing 16. Consequently, the canister 8 integral with the pump module 18 can be made compact as a whole. This makes it possible to improve the on-vehicle mountability of the canister 8. Besides, any special mounting part such as bracket need not be used for mounting the pump module 18 to the casing 16 and it is possible to reduce the number of accessory parts for the mounting. Further, since the center of gravity of the entire canister 8 lies nearly centrally of the canister 8, even if vibration is imposed on the body of the automobile during travel of the automobile, both canister 8 and pump module 18 exhibit an integral vibratory behavior. Thus, it is possible to make the pump module 18 difficult to be influenced by vibration. More particularly, it is possible to prevent an excessive load from acting on the connection between the casing 16 of the canister 8 and the pump module 18 which would cause breakage of the connection.

According to the canister 8 used in the second embodiment, since the casing 16 is in the shape of a generally U-shaped cylindrical body, the vapor flow path is relatively long in the area from one end portion to another end portion of the cylindrical body. Therefore, the passing distance of the vapor through the adsorbent 10, including the adsorbent 10 contained in the first chamber 43 and the adsorbent 10 contained in the second chamber 44, becomes long, whereby the vapor can be surely adsorbed and trapped by the adsorbent 10.

The pump module 18 is mounted in the casing 16 from the outside by being fitted on the valley portion 16a. Therefore, the pump module 18 and the other constructional portion of the canister 8 may be separately fabricated in advance and thereafter may be combined with each other. Thus, in comparison with a canister of the type in which a pump module is incorporated within a casing, the canister 8 including the pump module 18 can be fabricated more easily.

According to the canister used in the second embodiment, a negative pressure is generated by the air pump 31 in the pump module 18, whereby the internal pressure of the casing 16 is reduced. Moreover, a reverse flow of vapor from the air pump 31 to the atmosphere is prevented by the check valve 32. Further, the introduction of air into the casing 16 is adjusted by the change-over valve 35. Thus, with the pump module 18, it is possible to ensure the generation of a negative pressure and the air flow adjusting function.

According to the pump module 18 used in this embodiment, since the trap canister 37 is disposed between the casing 16 and the air pump 31, even if vapor should be discharged from the casing 16, the vapor can be trapped by the trap canister 37 and it is possible to prevent the vapor from flowing into the air pump 31.

According to the canister 8 used in this embodiment, the first and second chambers 43, 44 are partitioned from each other by the partition plate 42 and are separated from each other by the pump module 18 which is positioned in the valley portion 16a of the casing 16. Consequently, the adsorbent 10 in the first chamber 43 and the adsorbent 10 in the second chamber 44 can be heat-insulated from each other by the partition plate 42 and the pump module 18. Therefore, the heat generated from the adsorbent 10 in the first chamber 43 can be prevented from exerting a bad influence on the adsorbent 10 in the second chamber 44.

Figure 17:
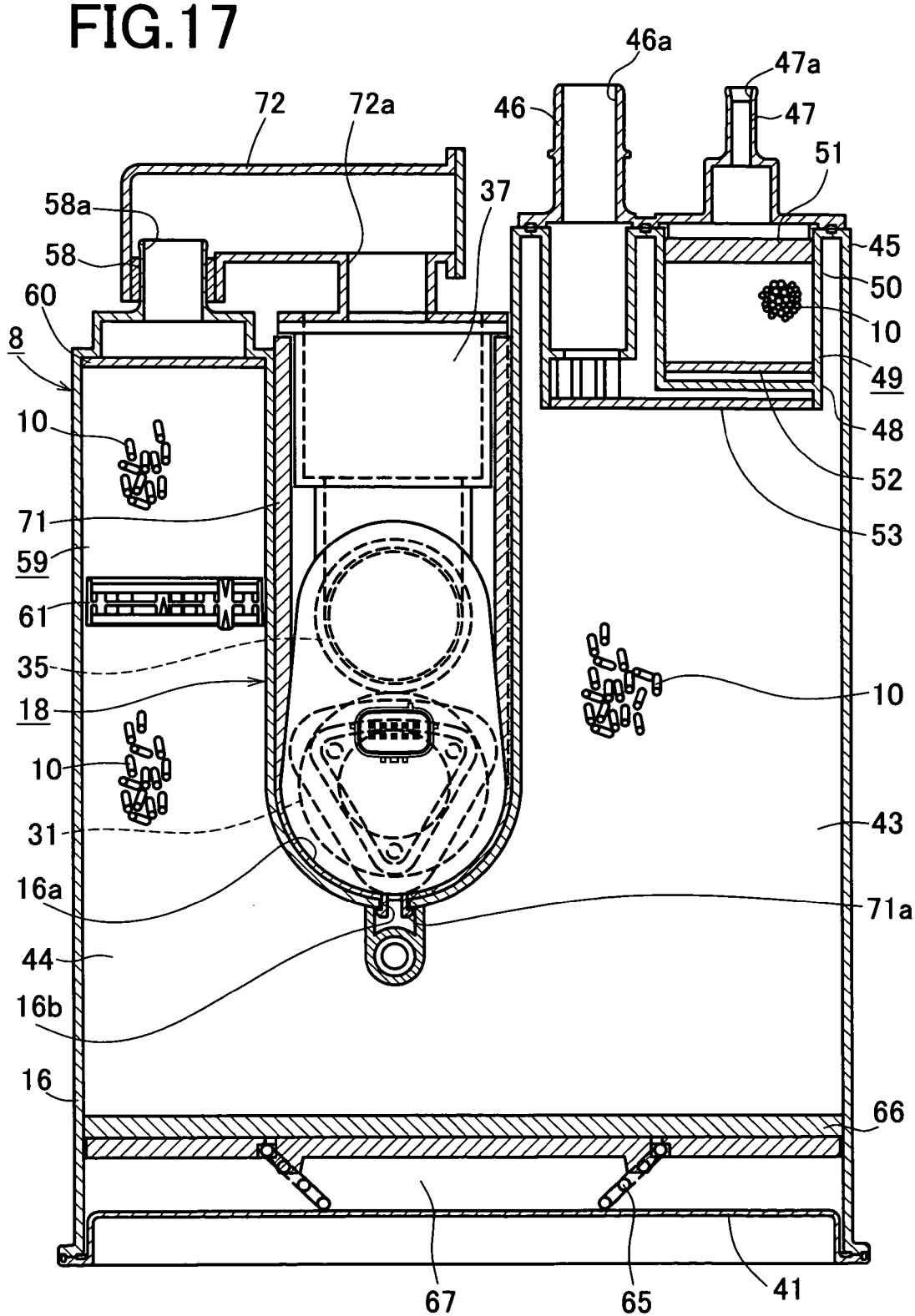
FIG. 17 is a sectional front view of the canister.

The present invention is not limited to the above second embodiment, but can be carried out in the following manner within the scope not departing from the gist of the invention. For example, in the above second embodiment the interior of the casing 16 of the canister 8 is partitioned into the first and second chambers 43, 44 by the partition plate 42. But, as shown in FIG. 17, the partition plate may be omitted and the first and second chambers 43, 44 may be brought into direct communication with each other. In this case, one perforated plate 66 is supported by the bottom plate 41 by mean of one spring 65. A continuous air layer 67 is formed between the bottom plate 41 and the perforated plate 66.

Further, although in the above second embodiment the pump module 18 is provided as a diagnosing functional part in the canister 8, any other part than the pump module may be provided as a diagnosing functional part.

[Third Embodiment]

A third embodiment of the present invention which embodies in a most preferred mode a pump module for use in diagnosing a fuel vapor processing apparatus according to the present invention will be described in detail below with reference to the accompanying drawings.

Figure 18:
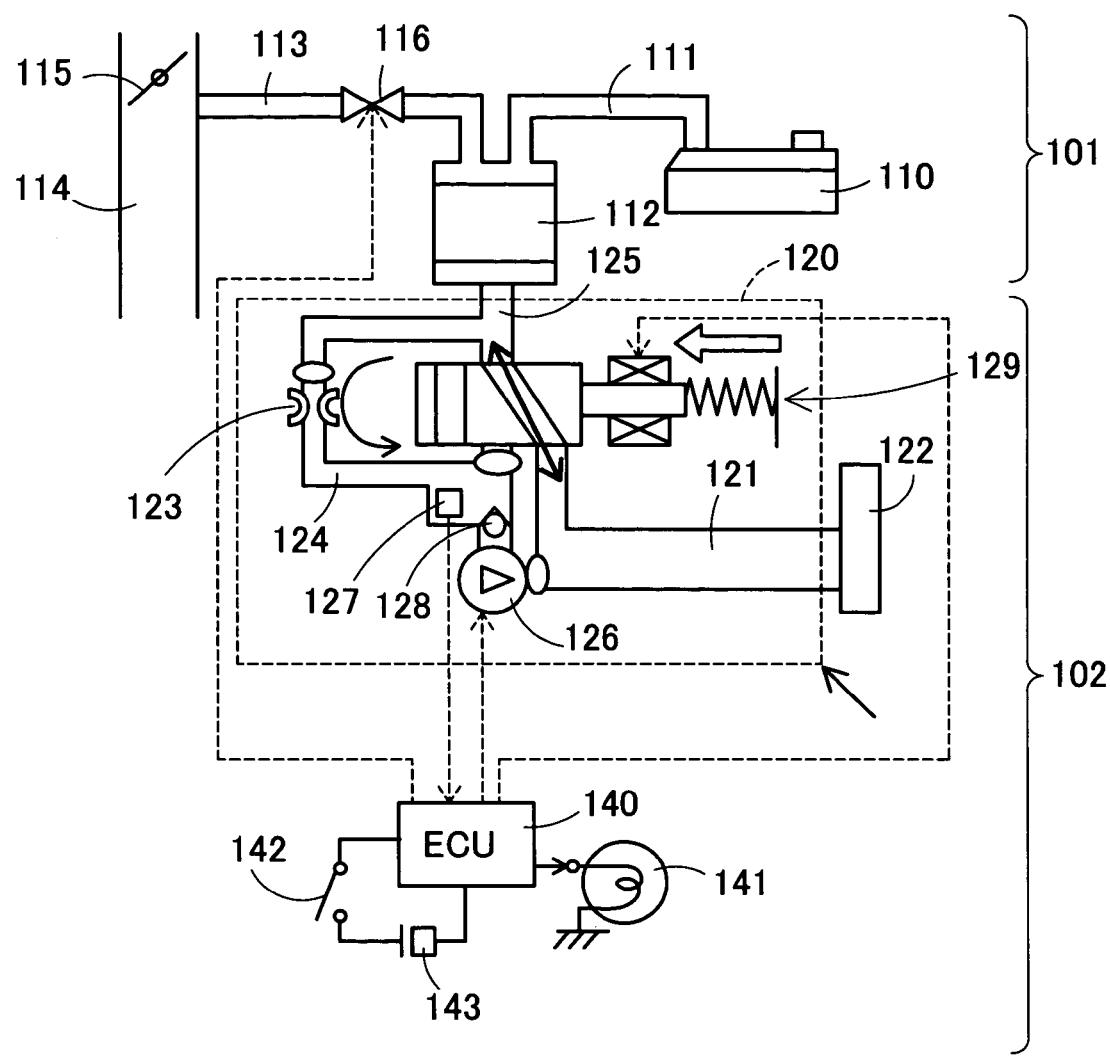
FIG. 18 is a schematic construction diagram of a fuel vapor processing apparatus and a failure diagnostic system therefor embodying the present invention, showing a state in which a change-over valve is not supplied with an electric current.
Figure 19:
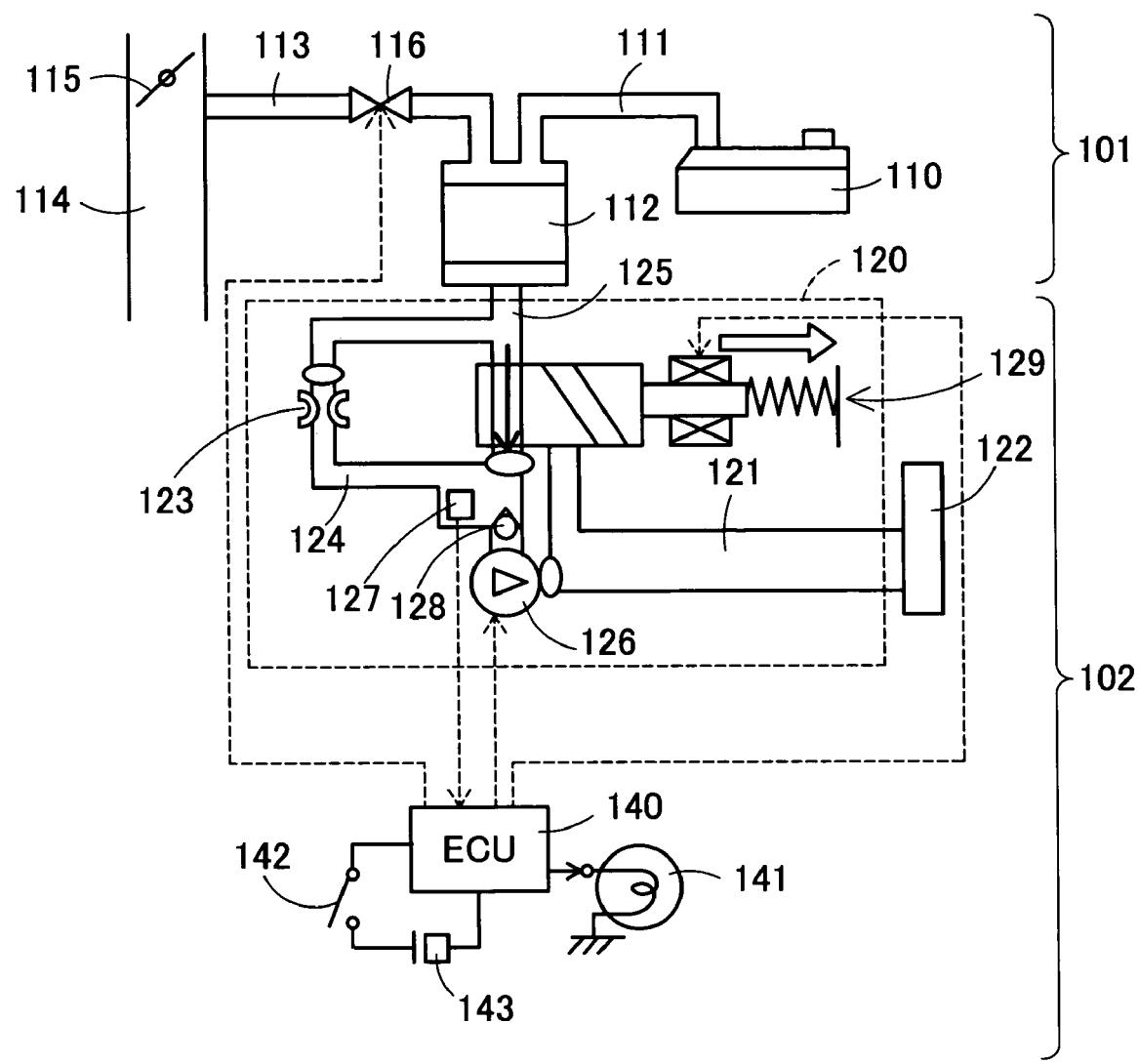
FIG. 19 is a schematic construction diagram equivalent to FIG. 18, showing a state in which the change-over valve is supplied with an electric current.

A schematic construction of the fuel vapor processing apparatus and that of the failure diagnostic system according to this embodiment are shown in FIGS. 18 and 19. FIG. 18 shows a state in which a change-over valve is not supplied with an electric current, while FIG. 19 shows a state in which the change-over valve is supplied with an electric current.

A fuel vapor processing apparatus 101 in this third embodiment is installed in a vehicle with a gasoline engine mounted thereon, in which fuel vapor developed in a fuel tank 110 is trapped without release to the atmosphere. The fuel vapor processing apparatus 101 is provided with a canister 112 for trapping through a vapor line 111 the fuel vapor generated in the fuel tank 110. The canister 112 contains an adsorbent which is activated charcoal.

Not only the vapor line 111 but also a purge line 113 is connected to the canister 112. The purge line 113 is in communication with an intake passage 114 at a position downstream of a throttle valve 115. A purge control valve 116 is disposed in the purge line 113. With this arrangement, during operation of the vehicular engine, a negative pressure developed in the intake passage acts on the purge line 113. In the fuel vapor processing apparatus 101, therefore, when the purge control valve 116 is opened, a fuel component trapped in the canister 112 is purged through the purge line 113 to the intake passage 114. The purge control valve 116 disposed in the purge line 113 is constituted by a solenoid valve which causes a valve body thereof to be operated upon receipt of an electric signal.

A pump module 120 is connected to the canister 112. The canister 112 traps only the fuel component contained in the fuel vapor which is introduced from the fuel tank 110, and discharges only the gas containing no fuel component to the outside from an air port 121 formed in the pump module 120. An air cleaner 122 is connected to an opposite end of the air port 121.

Figure 20:
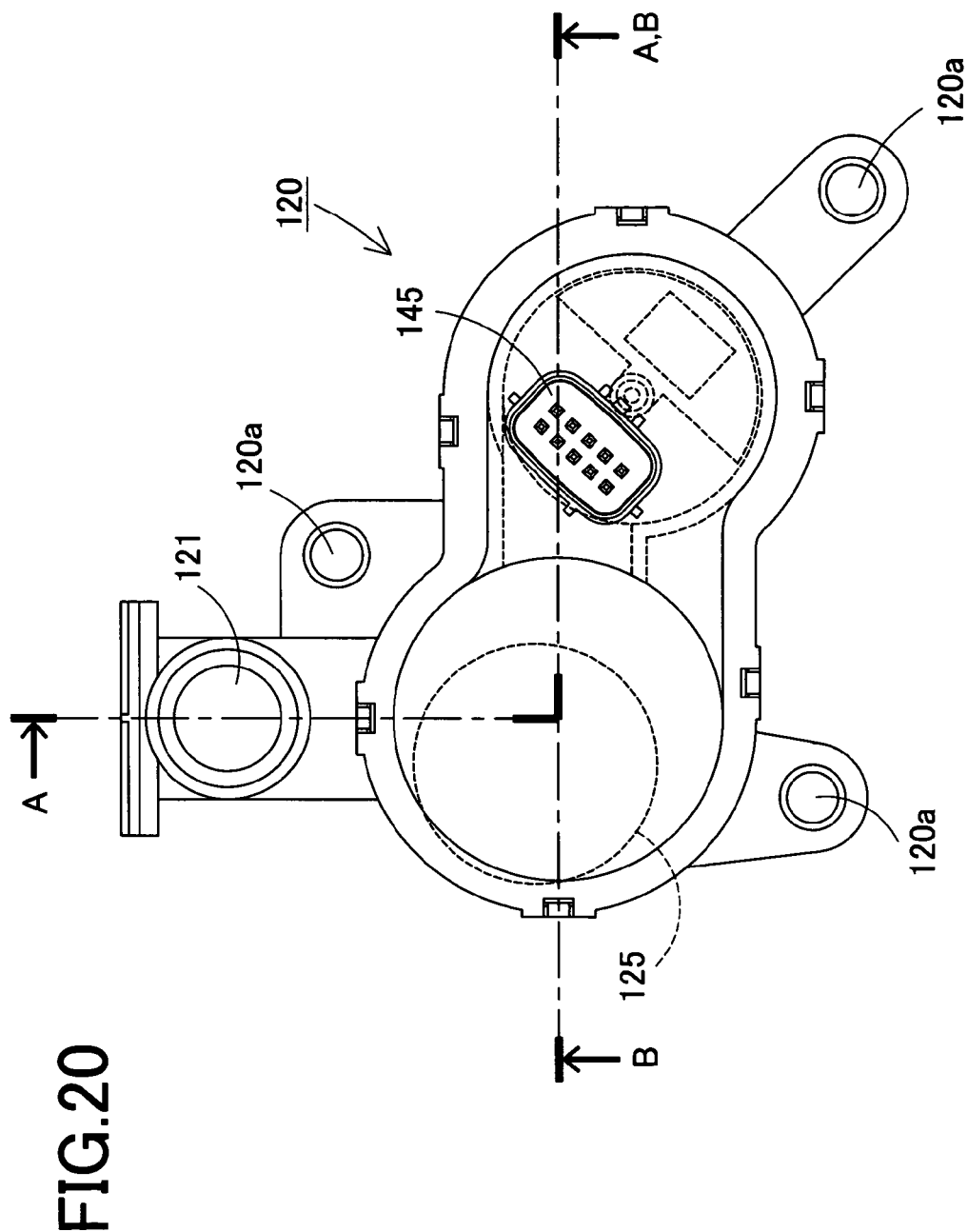
FIG. 20 is a plan view showing a schematic construction of a pump module.
Figure 21:
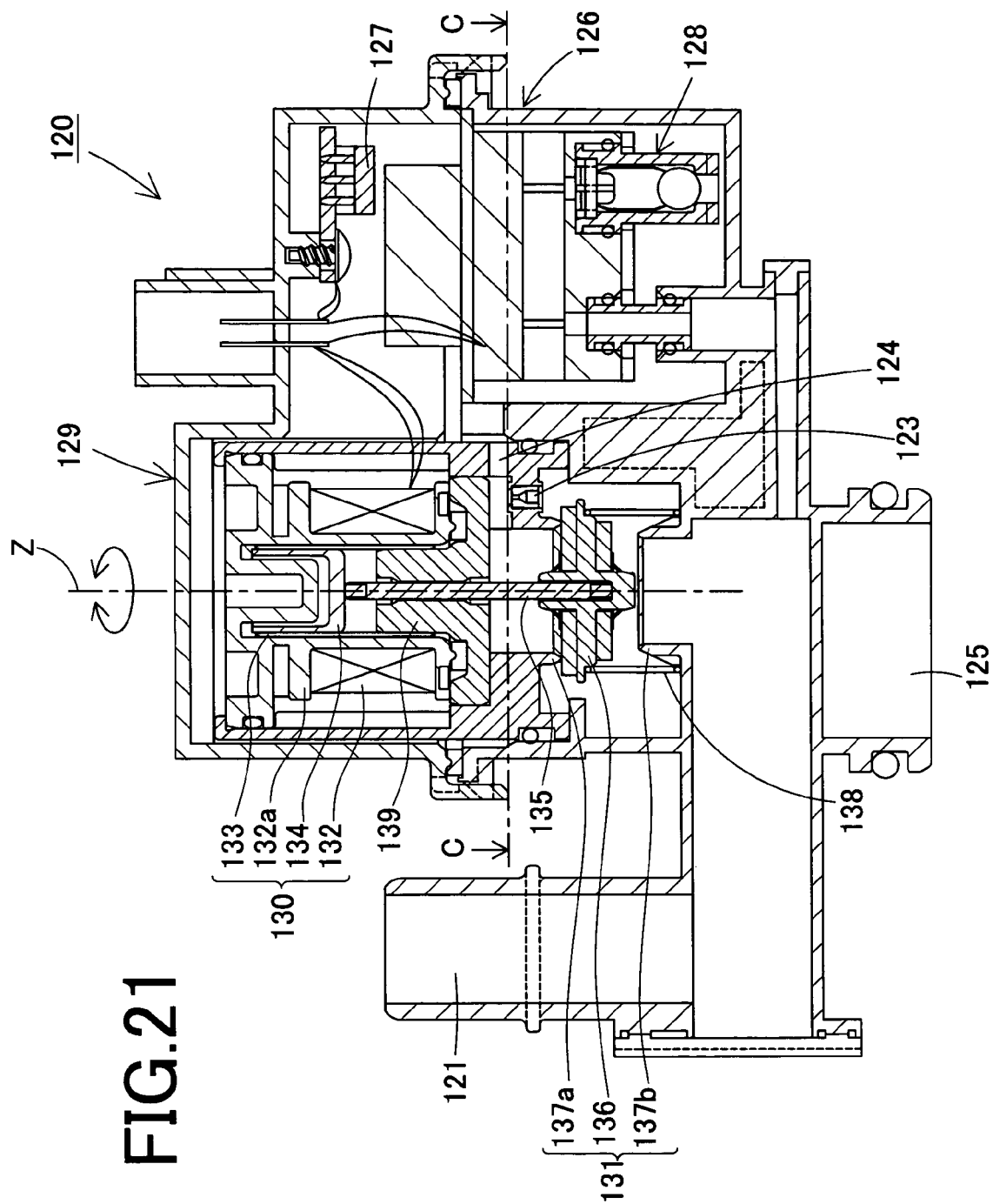
FIG. 21 is a sectional view taken on line A—A in FIG. 20.
Figure 22:
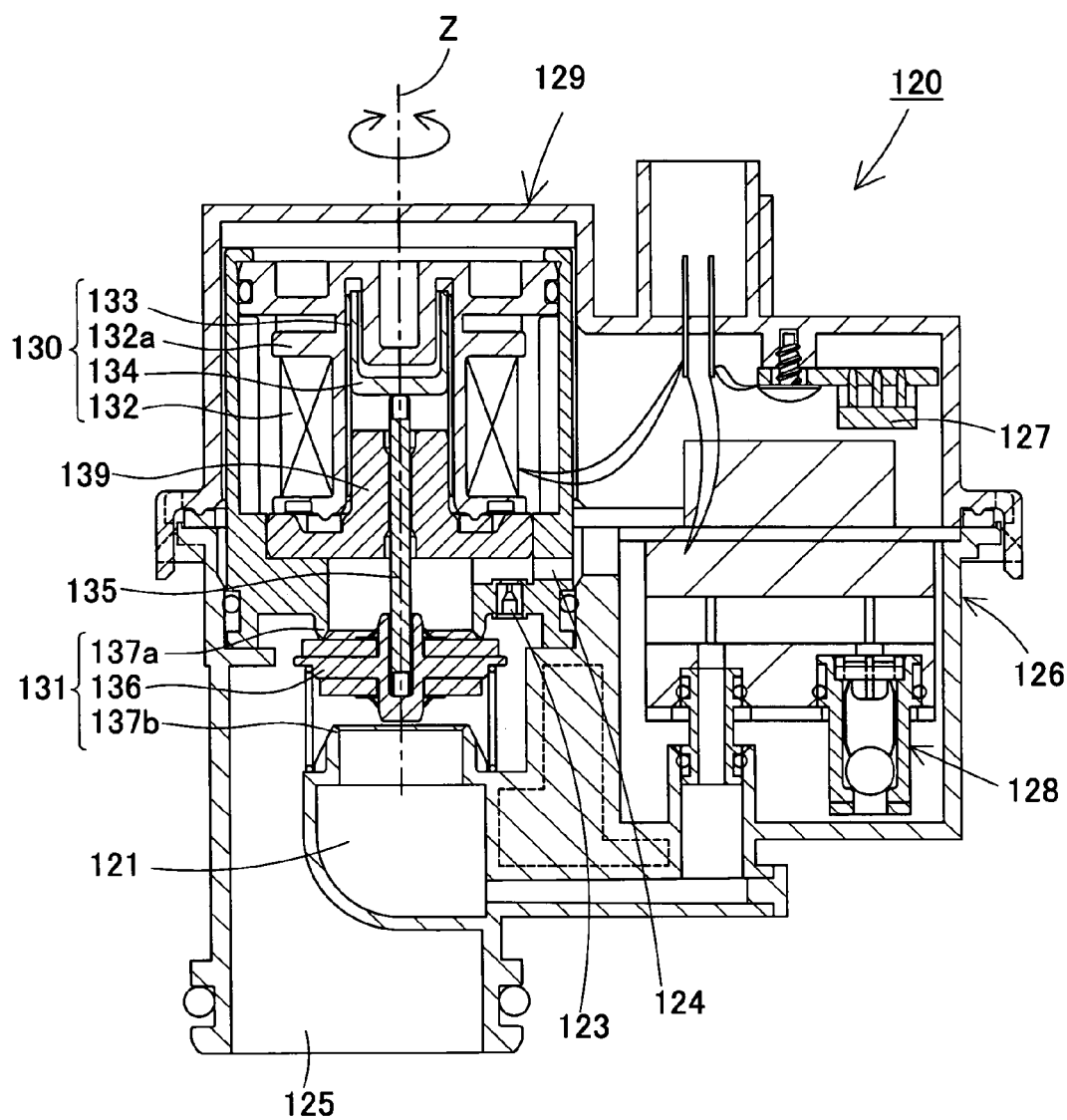
FIG. 22 is a sectional view taken on line B—B in FIG. 20.

The pump module 120 will be described below with reference also to FIGS. 20 to 22. FIG. 20 is a plan view showing the pump module 120. FIG. 21 is a sectional view taken on line A—A in FIG. 20. FIG. 22 is a sectional view taken on line B—B in FIG. 20.

As shown in FIG. 20, the pump module 120 has three mounting holes 120a and is mounted to the vehicle side by utilizing the mounting holes 120a. The pump module 120 is provided with a connector 145 for connection of wiring between it and an ECU 140 which will be described later.

Further, as shown in FIGS. 21 and 22, the pump module 120 is formed with an air port 121 connected to the air cleaner 122, an orifice flow path 124 with an orifice 123 formed therein, and a connection port 125 connected to the canister 112. The pump module 120 is further provided with a vacuum pump 126 for reducing the internal pressure of the fuel vapor processing apparatus 101, a pressure sensor 127 for detecting internal pressures of the fuel vapor processing apparatus 101 and the orifice flow path 124, and a change-over valve 129 for changing from a state of communication to a cut-off state or vice versa between the connection port 125 and the air port 121. According to this construction, the internal pressure of the fuel vapor processing apparatus 101 held in a hermetically sealed state is reduced by the vacuum pump 126 and diagnosing of the fuel vapor processing apparatus 101 is performed based on subsequent changes in pressure.

The vacuum pump 126 is a vane pump which is activated by a DC motor. By reverse rotating the DC motor, it is also possible to let the vacuum pump 125 generate a positive pressure. Thus, it is also possible to pressurize the interior of the fuel vapor processing apparatus 101 held in a hermetically sealed state and conduct diagnosis based on subsequent pressure changes. A check valve 128 is disposed upstream of the vacuum pump 126. The check valve 128 functions to stop the flow of gas from the vacuum pump 126 toward the orifice flow path 124 or the connection port 125.

The change-over valve 129 has a solenoid (actuator) portion 130 and a valve portion 131. The solenoid portion 130 includes a coil 132 which comprises a hollow coil bobbin 132a and copper wire wound thereon, a magnetic tube 133 fitted and fixed into the hollow space of the coil bobbin 132a, and a movable iron core 134 fitted slidably within the magnetic tube 133. On the other hand, the valve portion 131 includes a diaphragm valve 136, a tapered, first valve seat 137a, and a tapered, second valve seat 137b.

A rod 135 is extended downward in the figure from the movable iron core 134 and is supported slidably by a guide member 139. A lower end of the rod 135 is connected to the diaphragm valve 136. When the solenoid portion is energized, the diaphragm valve 136 moves vertically in the figure. With a biasing spring 138, the diaphragm valve 136 is urged constantly from below in the figure in a direction in which it comes into abutment against the first valve seat 137a (moves away from the second valve seat 137b). Thus, when the coil 132 is not energized, the diaphragm valve 136 is put in abutment against the first valve seat 137a and is spaced away from the second valve seat 137b. At this time, a high sealing performance is attained because the first valve seat 137a is tapered. In this state, the air port 121 and the connection port 125 are in communication with each other through the second valve seat 137b (see FIG. 18).

On the other hand, when the coil 132 is energized, the coil 132 attracts the movable iron core 134. Since this attracting force is larger than the biasing force of the biasing spring 138, the movable iron core 134 and the rod 135 moves downward in the figure. With this movement of the rod 135, the diaphragm valve 136 moves away from the first valve seat 137a and comes into abutment against the second valve seat 137b (see FIG. 27). At this time, a high sealing performance is attained because the second valve seat 137b is tapered. In this state, the air port 121 and the connection port 125 are brought out of communication with each other, while the connection portion 125 and the vacuum pump 126 are put in direct communication with each other (see FIG. 19).

Figure 23:
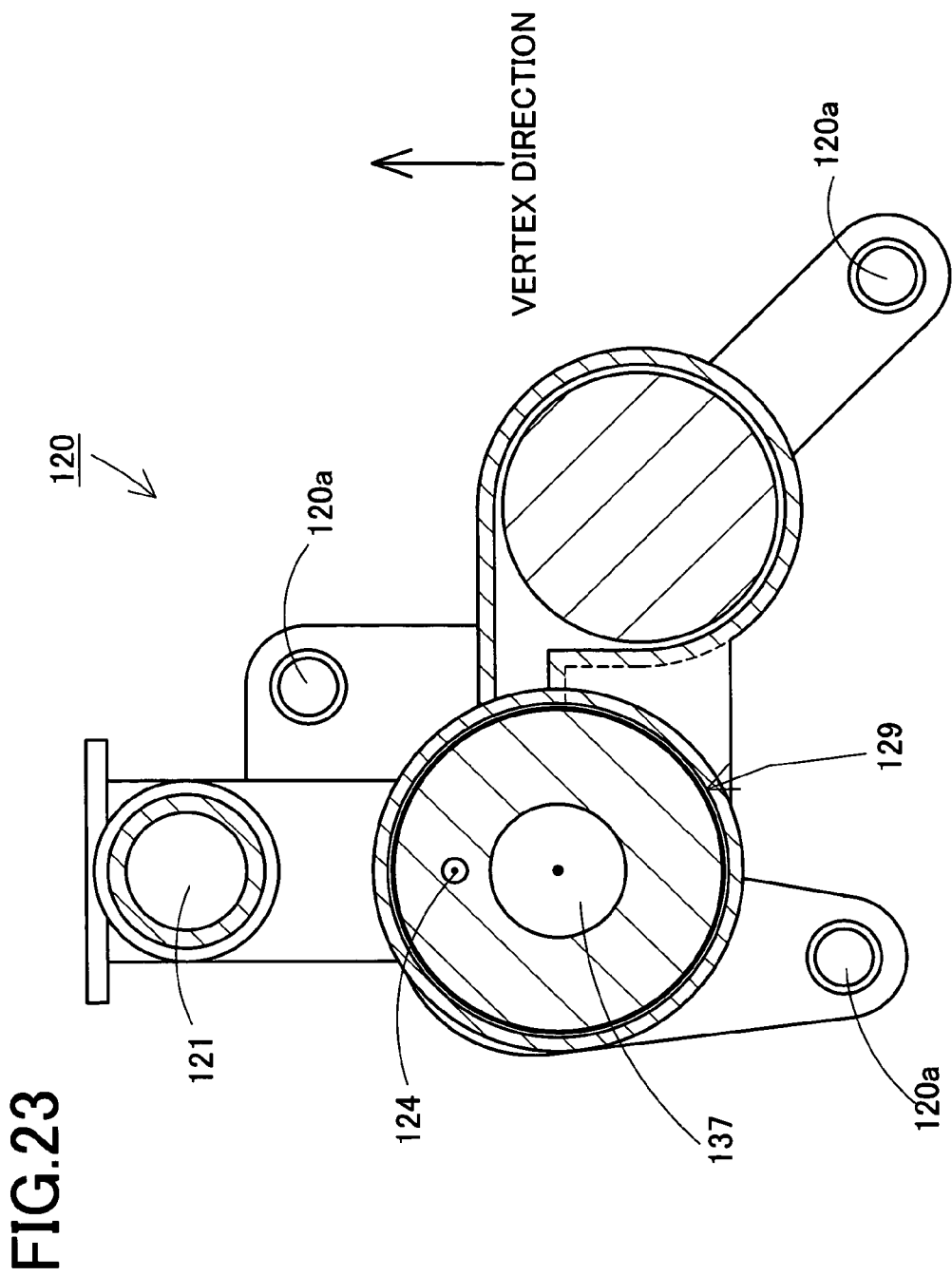
FIG. 23 is a diagram for explaining that an orifice is disposed always in a vertex direction irrespective of in what state the pump module is mounted on a vehicle.
Figure 24:
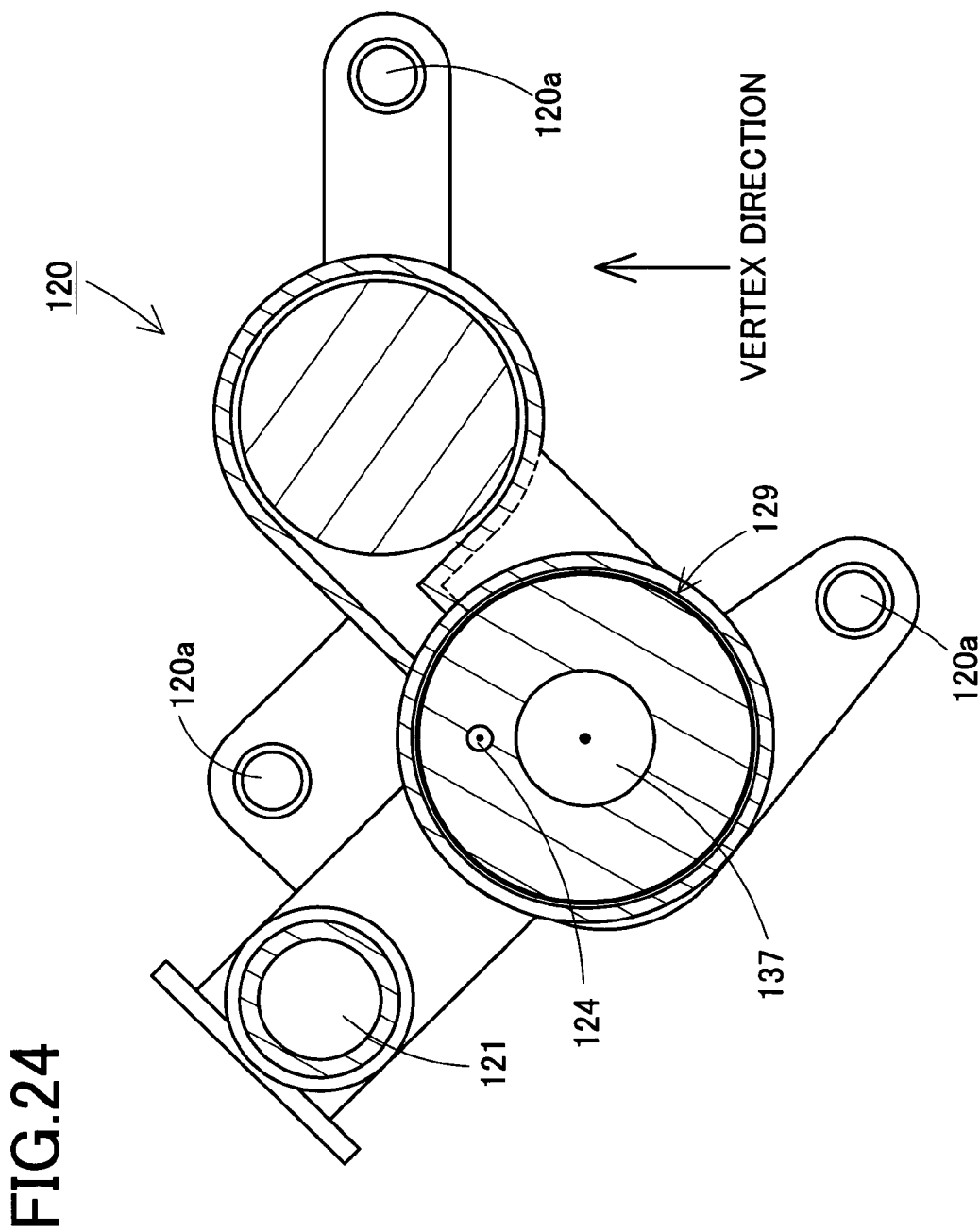
FIG. 24 is also a diagram for explaining that the orifice is disposed always in a vertex direction irrespective of in what state the pump module is mounted on a vehicle.

The orifice 123 is provided between the actuator portion 130 and the valve portion 131 in the change-over valve 129. The change-over valve 129 can be mounted in the case of the pump module 120 while being rotated about Z axis which is positioned on an extension line in the movable direction of the diaphragm valve 136. Consequently, when mounting the pump module 120 to the vehicle side by utilizing the three mounting holes 120a, as shown in FIG. 23 or FIG. 24, the orifice 123 can be disposed always in a vertex direction and be positioned above an opening/closing portion 137(a portion corresponding to the inside of the first valve seat 137b) of the change-over valve 129, irrespective of in what state the pump module 120 is mounted on the vehicle. As a result, when dust, water, fine adsorbent particles, intra-pipe oil, plastic extract, and assembling oil drop by their own weights, it is possible to prevent the orifice 123 from being plugged with those foreign matters. FIGS. 23 and 24 are sectional views taken on line C—C in FIG. 21.

Returning to FIG. 18, a failure diagnostic system 102 for diagnosing the fuel vapor processing apparatus 101 with respect to air-tightness is constituted by the pump module 120 having the above construction, ECU 140 and warning lamp 141. The ECU 140 not only controls the vehicular engine but also controls purging in the fuel vapor processing apparatus 101. For example, for purging the fuel component in an amount suitable for engine operation, the ECU 140 controls the purge control valve 116 in accordance with a required drive duty value.

In addition, the ECU 140 controls the diagnosing operation related to air-tightness of the fuel vapor processing apparatus 101. More specifically, where required, the ECU 140 controls the purge control valve 116, the vacuum pump 126 and the change-over valve 129 in accordance with detected signals provided from various sensors and acquires a detected signal from the pressure sensor 127. Based on the detected value from the pressure sensor 127, the ECU 140 checks air-tightness failures of the fuel vapor processing apparatus 101. The failures include an air-tightness failure of the fuel tank 110, an air-tightness failure of the canister 112 and an air-tightness failure of pipe connections in the vapor line 111 and purge line 113.

The warning lamp 141, which is installed in the vehicular driver's seat, is adapted to operate for informing the driver of the result of the above diagnosing operation. When the ECU 140 determines that a failure is occurring, it causes the warning lamp 141 to light or flicker, while in other cases, it causes the warning lamp 141 to go OFF.

As known well, the ECU 140 includes a central processing unit (CPU), a read-only memory (ROM), a random access memory (RAM), a backup RAM, an external input circuit, an external output circuit, and the like. The ECU 140 constitutes a logic operation circuit in which the CPU, ROM, RAM and backup RAM are connected with the external input and output circuits through a bus. The ROM pre-stores predetermined control programs related to engine control, purge control and diagnosing control. The RAM temporarily stores the results of operations performed by the CPU. The backup RAM preserves pre-stored data. The backup RAM preserves diagnostic results on failures as diagnostic data.

In addition, an ignition switch 142 and a soak timer 143 are connected to the external input circuit in the ECU 140. The ignition switch 142 is turned ON and OFF for starting and stopping the vehicular engine. When turned ON, the ignition switch 142 permits the application of electric power to the ECU 140, while when turned OFF, it cuts off the supply of electric power to the ECU 140. The soak timer 143 starts counting when the ignition switch 142 is turned OFF, and when a predetermined time has elapsed after stop of the engine, the soak timer 143 activates the ECU 140 to start diagnosing.

Figure 25:
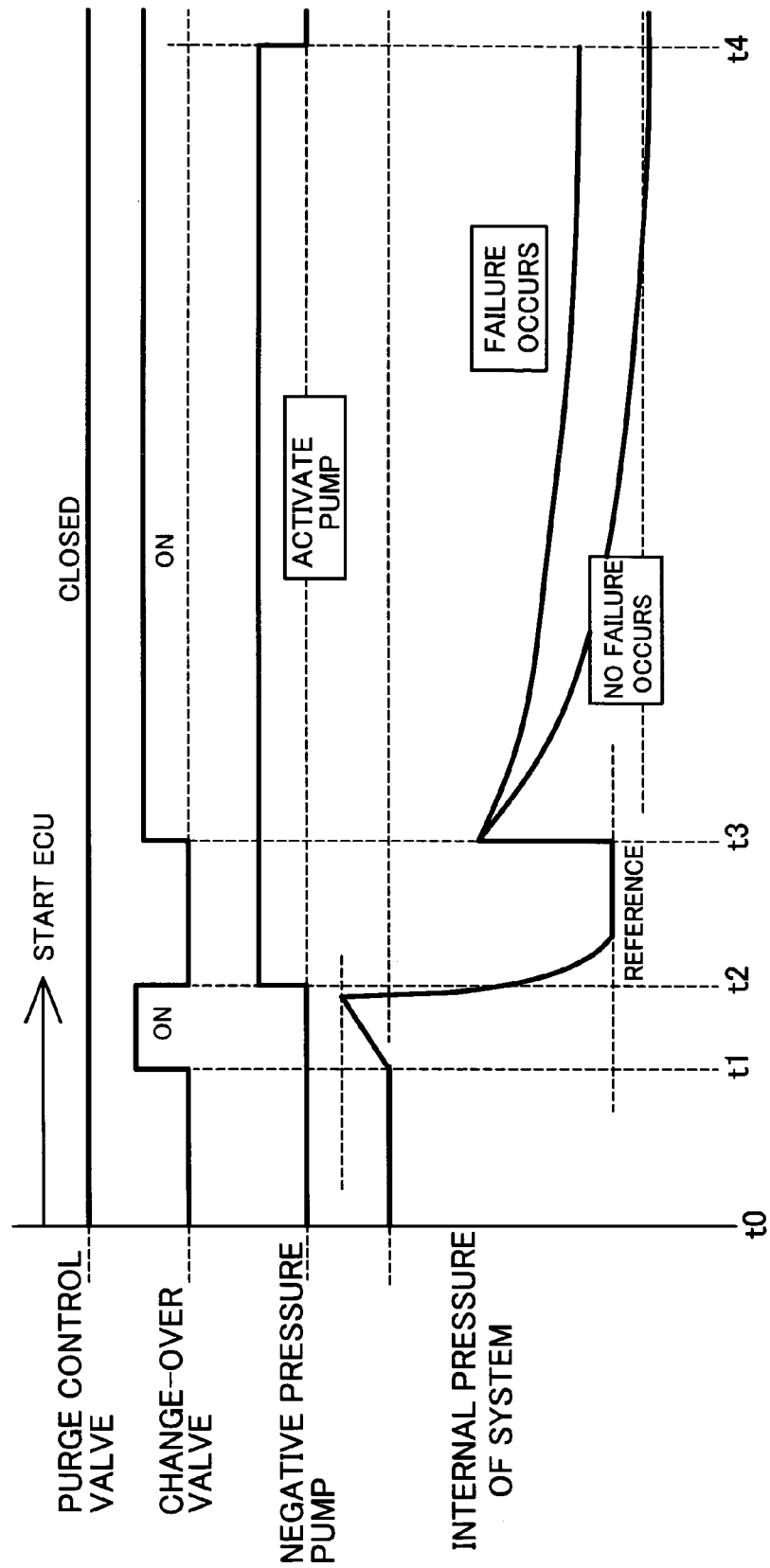
FIG. 25 is a time chart showing an outline of a diagnosing process in the failure diagnostic system.
Figure 26:
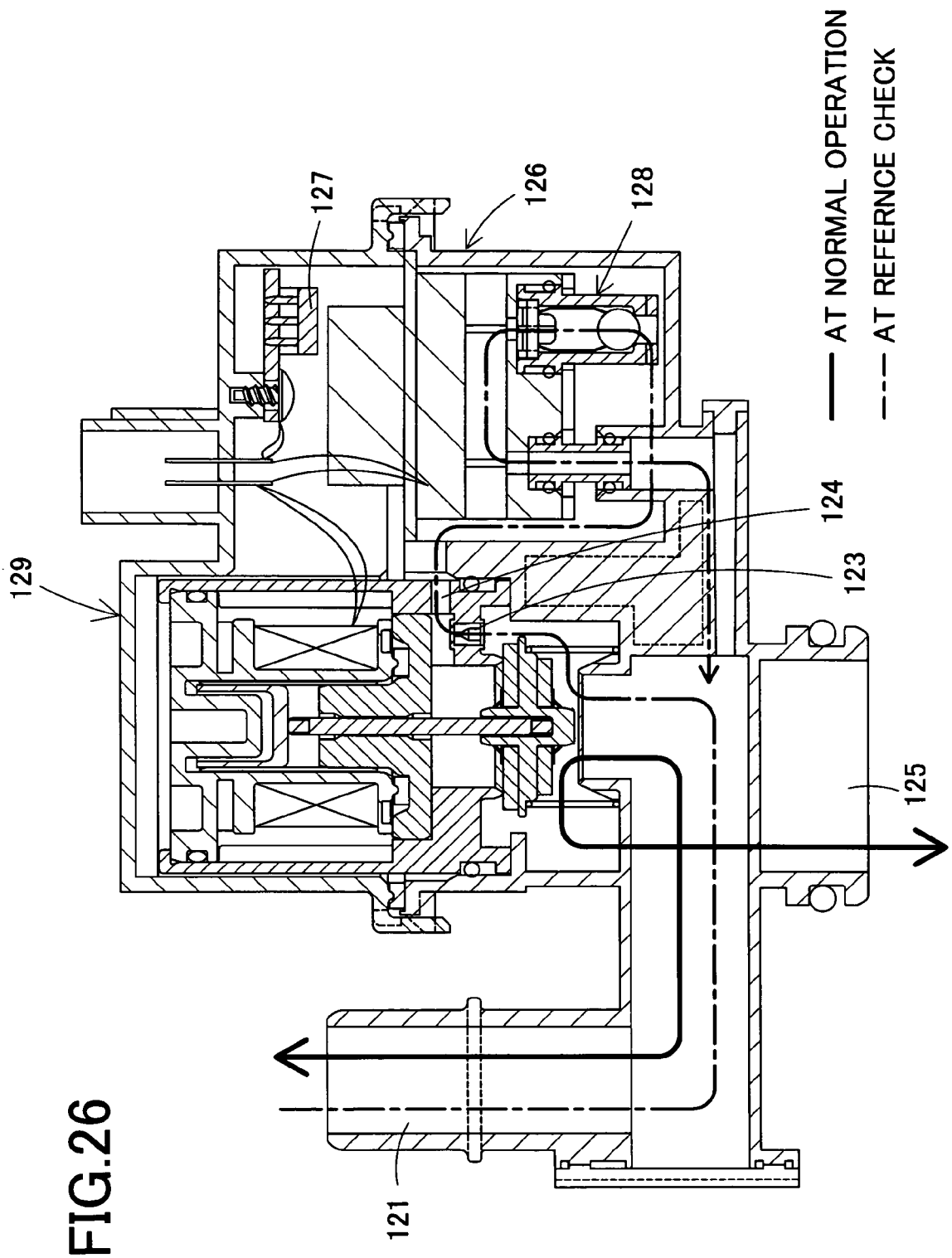
FIG. 26 is a diagram for explaining a flow of gas within the pump module in a state in which the change-over valve is not supplied with an electric current.
Figure 27:
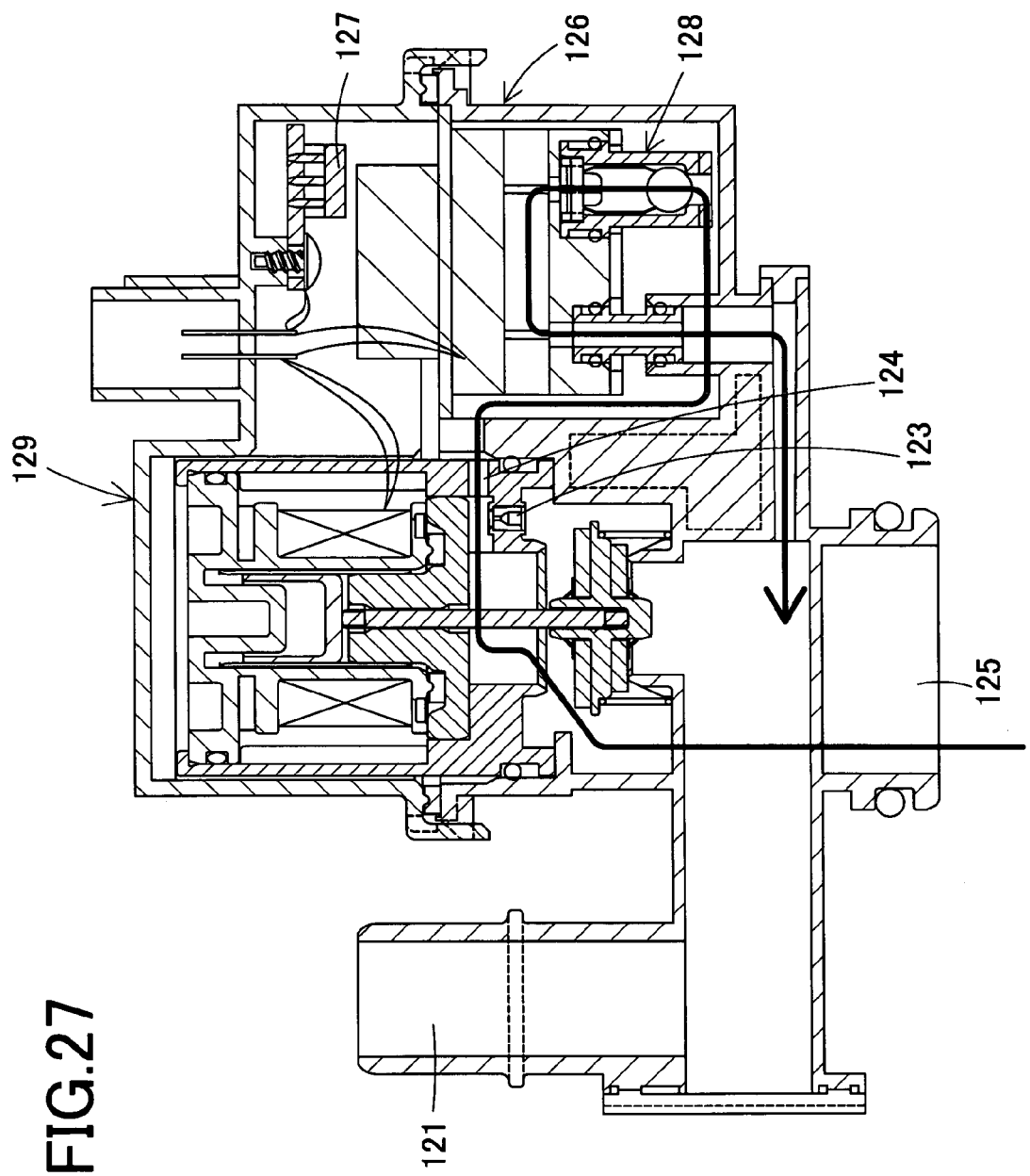
FIG. 27 is a diagram for explaining a flow of gas within the pump module in a state in which the change-over valve is supplied with an electric current.

Next, operation of the failure diagnostic system 102 constructed as above will be described below with reference to FIGS. 25 to 27. FIG. 25 is a time chart showing an outline of diagnosing. FIG. 26 illustrates the flow of gas in the pump module 120 upon turning ON of the change-over valve 129. FIG. 27 illustrates the flow of gas in the pump module 120 upon turning OFF of the change-over valve 129.

The failure diagnosing operation is started at time t0 which is a time point after turning OFF of the ignition switch 142 and after subsequent lapse of a predetermined time (about several hours) counted by the soak timer 143. That is, the ECU 140 is started at time t0. At this time, the change-over valve 129 is turned OFF, and in the pump module 120, as shown in FIG. 26, the connection port 125 and the air port 121 are brought into communication with each other and gas flows as indicated with a solid line. In this state, therefore, the interior of the fuel vapor processing apparatus 101 is not sealed hermetically. Atmospheric pressure is measured by the pressure sensor 127 until reaching time t1.

When time t2 is reached, the change-over valve 129 is turned ON and the amount of fuel vapor produced from the fuel tank 110 is checked. More specifically, the internal pressure of the fuel vapor processing apparatus 101 is measured by the pressure sensor 127 and the amount of fuel vapor produced is checked. At this time, if the amount of fuel vapor is large, that is, if a rise of pressure is large, the diagnosing process is stopped.

On the other hand, if the diagnosing process is to be continued, then at time t3, the change-over valve 129 is turned OFF and the vacuum pump 126 is activated. As a result, the gas present within the pump module 120 passes through the orifice 123 from the air port 121 and flows to the vacuum pump 126, as indicated with a dot-dash line in FIG. 26. Then, the internal pressure of the orifice flow path 124 eventually reaches a saturated pressure at the diameter (e.g., 0.5 mm) of the orifice 123. At this time, the saturated pressure is measured by the pressure sensor 127. The saturated pressure thus measured is used as a reference pressure in diagnosing.

In the pump module 120 used in this embodiment, the orifice 123 can be disposed always in a vertex direction and be positioned above the opening/closing portion 137 of the change-over valve 129. Therefore, when measuring the reference pressure, there is no fear of the orifice 123 being plugged with dust, water, fine adsorbent particles, intra-pipe oil, plastic extract, or assembling oil. Thus, it is possible to always measure a correct reference pressure.

Then, at time t3, the change-over valve 129 is again turned ON and the leakage of the fuel vapor processing apparatus 101 is checked until reaching time t4. At this time, as shown in FIG. 27, the air port 121 and the connection port 125 are brought out of communication with each other, so that the interior of the fuel vapor processing apparatus 101 is hermetically sealed. Further, since there occurs such a gaseous flow as indicated with a solid line in FIG. 27 under the action of the vacuum pump 126, the internal pressure of the fuel vapor processing apparatus 101 is reduced. At this time, if there is no failure with the fuel vapor processing apparatus 101, the internal pressure of the fuel vapor processing apparatus drops to a value lower than the reference pressure. In contrast therewith, if the fuel vapor processing apparatus 101 undergoes a failure, the internal pressure thereof does not drop to the reference pressure.

Thus, upon occurrence of a trouble, there arises a pressure change different from that in normal condition, so that diagnosing of the fuel vapor processing apparatus 101 can be done based on such a pressure change. In the failure diagnostic system 102 for the fuel vapor processing apparatus 101 according to this embodiment, the reference value in diagnosing can be measured accurately and therefore diagnosing of the fuel vapor processing apparatus 101 can be done with a high accuracy.

In the pump module 120 used in the third embodiment, as described in detail above, the orifice 123 is provided between the solenoid portion 130 and the valve portion 131 of the change-over valve 129. Besides, the change-over valve 129 can be mounted while being rotated about Z axis with respect to the case of the pump module 120. Consequently, the orifice 123 can always be disposed in a vertex direction irrespective of in what state the pump module 120 is mounted on the vehicle, whereby the orifice 122 can be prevented from being plugged up with dust or water. Thus, since the reference value in diagnosing can always be measured accurately, it is possible to effect diagnosing of the fuel vapor processing apparatus 101 with a high accuracy.

The above third embodiment is a mere illustration and does not limit the present invention at all. It goes without saying that various improvements and modifications may be made within the scope not departing from the gist of the invention.

What is claimed is:

1. A failure diagnostic system for a fuel vapor processing apparatus which is disposed correspondingly to an engine mounted on a vehicle and wherein fuel vapor generated in a fuel tank is trapped by a canister and the trapped fuel vapor is purged to an intake passage in the engine,
wherein the fuel vapor processing apparatus comprises a processing flow path extending from the fuel tank to the intake passage and including the canister; and
the failure diagnostic system comprises:
closure means for closing the processing flow path;
pressurizing means for pressurizing the interior of the processing flow path;
pressure reducing means for reducing the internal pressure of the processing flow path;
pressure detecting means for detecting an internal pressure of the processing flow path;
temperature detecting means for detecting an atmosphere temperature of the fuel tank;
first diagnostic means which, after stop of the engine, controls the closure means to close the processing flow path and which, when the atmosphere temperature detected by the temperature detecting means is lower than a predetermined value, controls the pressure reducing means to reduce the internal pressure of the processing flow path and checks air-tightness of the processing flow path based on behavior of the pressure detected by the pressure detecting means after the pressure reduction; and
second diagnostic means which, after stop of the engine, controls the closure means to close the processing flow path and which, when the atmosphere temperature detected by the temperature detecting means is higher than a predetermined value, controls the pressurizing means to pressurize the interior of the processing flow path and checks the air-tightness of the processing flow path based on behavior of the pressure detected by the pressure detecting means after the pressurization.

2. The failure diagnostic system according to claim 1, wherein
the pressurizing means and the pressure reducing means are constituted by a single air pump,
the first diagnostic means reduces the internal pressure of the processing flow path by rotating the air pump forward to suck in air, and
the second diagnostic means pressurizes the interior of the processing flow path by rotating air pump reversely to discharge air.

3. The failure diagnostic system according to claim 1, further comprising:
warning means for informing occurrence of an air-tightness failure when the first or the second diagnostic means determines that the processing flow path involves the failure in air-tightness; and
a memory for storing the presence of the failure.

4. The failure diagnostic system according to claim 1, wherein
the fuel vapor processing apparatus further comprises a purge assisting control means which, when the fuel vapor trapped by the canister is purged to the intake passage, controls the pressurizing means to pressurize the interior of the canister and thereby assist the purging.

5. The failure diagnostic system according to claim 2, wherein the fuel vapor processing apparatus further comprises a purge assisting control means which, when the fuel vapor trapped by the canister is purged to the intake passage, controls the air pump to pressurize the interior of the canister and thereby assist the purging.

6. A failure diagnostic system for a fuel vapor processing apparatus which is disposed correspondingly to an engine mounted on a vehicle and wherein fuel vapor generated in a fuel tank is trapped by a canister through a vapor line and the trapped fuel vapor is purged to an intake passage in the engine through a purge line,
wherein the fuel vapor processing apparatus comprises a processing flow path extending from the fuel tank to the intake passage and including the vapor line, the canister and the purge line;
the failure diagnostic system comprises:
a vapor control valve disposed in the vapor line for closing the processing flow path and a purge control valve disposed in the purge line;
a single air pump for selectively pressurizing the interior of the processing flow path or reducing the internal pressure of the processing flow path;
a pressure sensor for detecting an internal pressure of the processing flow path;
a temperature sensor for detecting an atmosphere temperature of the fuel tank; and
an electronic control unit for checking air-tightness of the processing flow path; and
the electronic control unit, after stop of the engine, controls the vapor control valve and the purge control valve to close the processing flow path and, when the atmosphere temperature detected by the temperature sensor is lower than a predetermined value, causes the air pump to rotate forward to suck in air, thereby reducing the internal pressure of the processing flow path, and checks air-tightness of the processing flow path based on behavior of the pressure detected by the pressure sensor after the pressure reduction, and
the electronic control unit, after stop of the engine, controls the vapor control valve and the purge control valve to close the processing flow path and, when the atmosphere temperature detected by the temperature sensor is not lower than the predetermined value, causes the air pump to rotate reversely to discharge air, thereby pressurizing the interior of the processing flow path, and checks air-tightness of the processing flow path based on behavior of the pressure detected by the pressure sensor after the pressurization.

7. The failure diagnostic system according to claim 6, further comprising:
warning means for informing the occurrence of an air-tightness failure when the electronic control unit determines that the processing flow path involves the failure in air-tightness; and
a memory for storing the presence of the failure.

8. The failure diagnostic system according to claim 6, wherein
the fuel vapor processing apparatus further comprises a purge assisting control means which, when the fuel vapor trapped by the canister is purged to the intake passage, controls the air pump to pressurize the interior of the canister and thereby assist the purging.

* * * * *